(12) United States Patent (10) Patent No.: US 9,223,194 B2
Fujita et al. (45) Date of Patent: Dec. 29, 2015

(54) ILLUMINATION LIGHT BEAM FORMING DEVICE, ILLUMINATION LIGHT SOURCE DEVICE AND IMAGE DISPLAY DEVICE

(71) Applicants: Kazuhiro Fujita, Machida (JP); Ikuo Maeda, Sagamihara (JP); Toshiharu Murai, Kawasaki (JP); Tatsuya Takahashi, Shinagawa (JP); Takehiro Nishimori, Yokohama (JP)

(72) Inventors: Kazuhiro Fujita, Machida (JP); Ikuo Maeda, Sagamihara (JP); Toshiharu Murai, Kawasaki (JP); Tatsuya Takahashi, Shinagawa (JP); Takehiro Nishimori, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 260 days.

(21) Appl. No.: 13/949,593

(22) Filed: Jul. 24, 2013

(65) Prior Publication Data

US 2014/0028983 A1 Jan. 30, 2014

(30) Foreign Application Priority Data

Jul. 26, 2012 (JP) ................................ 2012-166027
Apr. 2, 2013 (JP) ................................ 2013-076669

(51) Int. Cl.
*G03B 21/16* (2006.01)
*F21V 7/00* (2006.01)
*G03B 21/20* (2006.01)
(Continued)

(52) U.S. Cl.
CPC ................ *G03B 21/204* (2013.01); *F21V 7/00* (2013.01); *F21V 13/04* (2013.01); *F21V 13/08* (2013.01); *F21V 13/14* (2013.01); *F21V 29/70* (2015.01); *G02B 6/4269* (2013.01); *G03B 21/16* (2013.01);
(Continued)

(58) Field of Classification Search
CPC .. G03B 21/204; G03B 21/16; G03B 21/2013; G03B 21/2066; G02B 6/4269; F21V 7/00; F21V 13/08; F21V 29/70; F21V 13/04; F21V 13/14

See application file for complete search history.

(56) References Cited

U.S. PATENT DOCUMENTS 7,111,942 B2 9/2006 Hirata et al.
2004/0090602 A1* 5/2004 Imade ........................... 353/102
(Continued)

FOREIGN PATENT DOCUMENTS

CN 101154011 A 4/2008
CN 101681087 A 3/2010
(Continued)

OTHER PUBLICATIONS

Combined Chinese Office Action and Search Report issued Mar. 27, 2015 in Patent Application No. 201310321261.9 (with English Translation).

*Primary Examiner* — Sultan Chowdhury
*Assistant Examiner* — Magda Cruz
(74) *Attorney, Agent, or Firm* — Oblon, McClelland, Maier & Neustadt, L.L.P.

(57) ABSTRACT

An illumination light beam forming device, including a first light source unit projecting a ring shaped light beam group, a second light source unit projecting light beams including a case the light beams being group, a combining unit for combining the light beam group projected from the first light source unit and light beams projected from the second light source unit, in which the combing unit includes a reflecting part formed to reflect one of the light beam groups, a transmitting part disposed able to transmit the other one of the light beam groups, and light beams projected from the second light source unit are disposed at an internal side of the light beam groups projected from the first light source unit when the two light beam groups are viewed from a plane including the reflecting part.

17 Claims, 20 Drawing Sheets

(51) Int. Cl.
*G02B 6/42* (2006.01)
*F21V 13/04* (2006.01)
*F21V 13/08* (2006.01)
*F21V 13/14* (2006.01)
*F21V 29/70* (2015.01)

(52) U.S. Cl.
CPC ........ *G03B 21/2013* (2013.01); *G03B 21/2066* (2013.01)

(56) References Cited

U.S. PATENT DOCUMENTS

| | | | | |
|---|---|---|---|---|
| 2004/0207818 | A1* | 10/2004 | Stahl | 353/38 |
| 2006/0114420 | A1* | 6/2006 | Kim | H04N 9/315 353/81 |
| 2006/0227086 | A1* | 10/2006 | Lyst et al. | 345/83 |
| 2008/0080572 | A1 | 4/2008 | Kamijima | |
| 2008/0170392 | A1* | 7/2008 | Speier et al. | 362/227 |
| 2010/0165298 | A1* | 7/2010 | Imade | 353/31 |
| 2010/0195059 | A1 | 8/2010 | Wada | |
| 2010/0328627 | A1 | 12/2010 | Miyazaki | |
| 2012/0320355 | A1 | 12/2012 | Maeda | |
| 2013/0107225 | A1 | 5/2013 | Miyazaki | |
| 2013/0308104 | A1* | 11/2013 | Nishimori et al. | 353/37 |

FOREIGN PATENT DOCUMENTS

| | | |
|---|---|---|
| CN | 102162982 A | 8/2011 |
| JP | 11-27472 | 1/1999 |
| JP | 2003-347595 | 12/2003 |
| JP | 2004-14367 | 1/2004 |
| JP | 2013-29796 | 2/2013 |
| KR | 10-2011-0001946 A | 1/2011 |

* cited by examiner

27(LIGHT SOURCE Ld22)
27(LIGHT SOURCE Ld21)
27(LIGHT SOURCE Ld28)
27(LIGHT SOURCE Ld23)
27(LIGHT SOURCE Ld24)
27(LIGHT SOURCE Ld25)
27(LIGHT SOURCE Ld26)
27(LIGHT SOURCE Ld27)

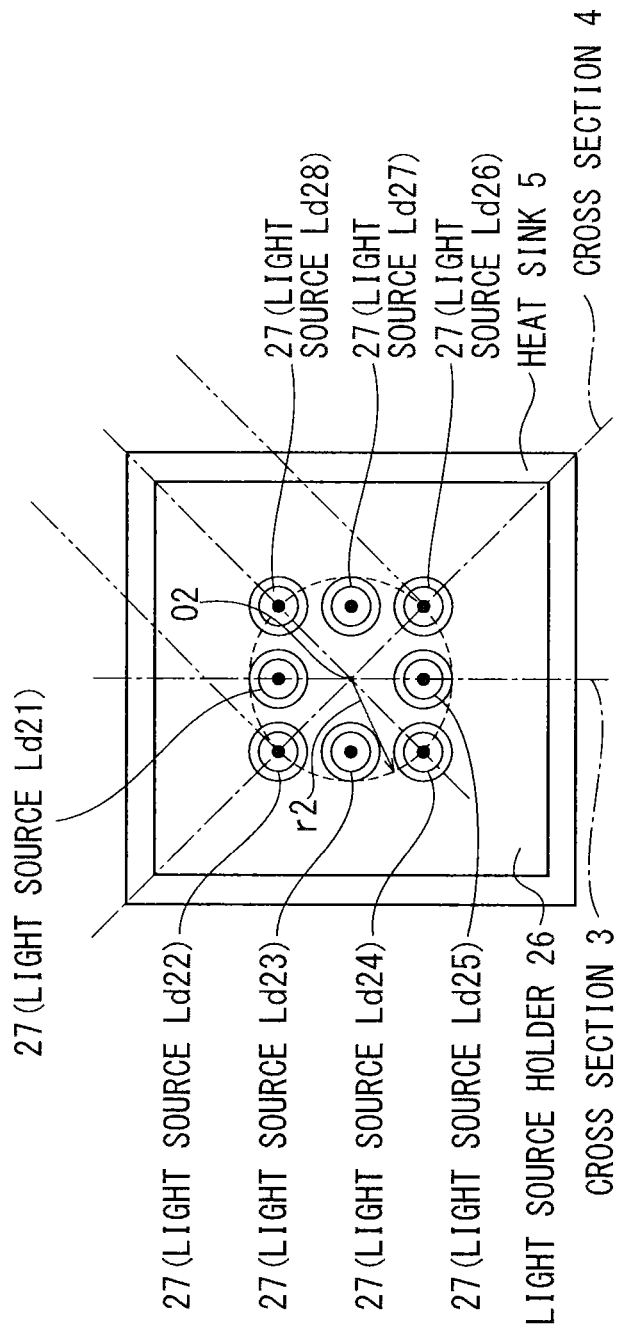

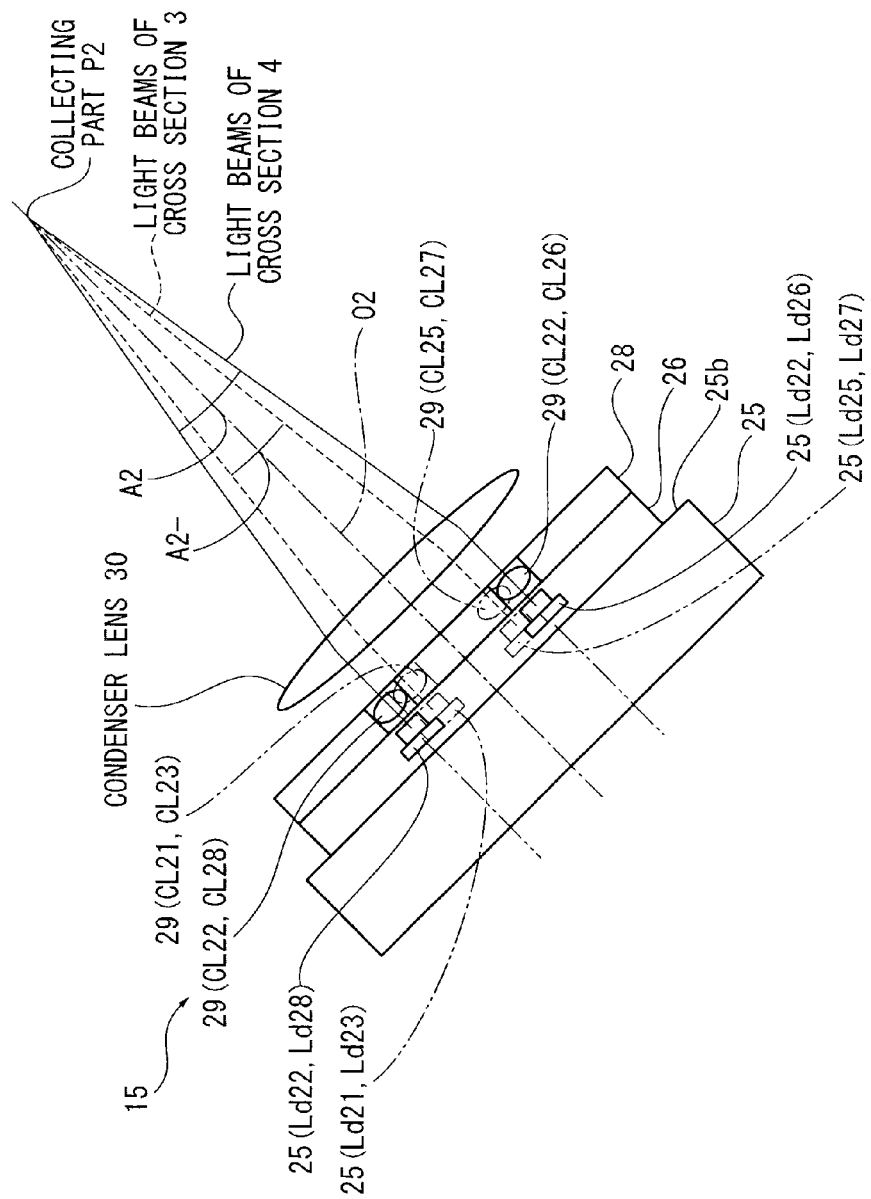

ILLUMINATION LIGHT BEAM FORMING DEVICE, ILLUMINATION LIGHT SOURCE DEVICE AND IMAGE DISPLAY DEVICE

CROSS-REFERENCE TO RELATED APPLICATIONS

The present application claims priority of each of Japanese Patent Application No. 2012-166027 filed on Jul. 26, 2012 and Japanese Patent Application No. 2013-076669 filed on Apr. 2, 2013, the entire content of which is incorporated herein by reference in its entirety.

BACKGROUND OF THE INVENTION

1. Field of the Invention

The present invention relates to an illumination light beam forming device in which a plurality of solid light sources are used, an illumination light source device including the illumination light beam forming device and an image display device including the illumination light source device.

2. Description of the Related Art

Conventionally, color illumination technologies emitting illumination light using laser light sources of red, blue and green and forming illumination light of a micro display are known.

In such color illumination technologies, color performance area can be broadened. Also, a light emitting size of the light source is smaller than that of a lamp light source. Therefore, illumination efficiency of the light source is higher than that of the lamp light source. Illumination effects thereof are comparatively brighter in view of power consumption. Consequently, the color illumination technologies using the laser light source can be used with high illumination efficiency towards micro displays. The laser light source is used thereby as the illumination light source of a projector.

In color illumination technologies as such, generally a plurality of laser light sources are disposed two-dimensionally on a substrate and light beams emitted from the plurality of laser light sources are bundled. In addition, in such a color illumination technology, in order to obtain stable light quantity, solid light sources are needed to be efficiently cooled to a desired temperature.

In general, for this cooling, a substrate disposed with a plurality of solid light sources is set onto a holder made of a metal having a comparatively high heat conductivity. In addition, a heat sink or the like with a certain surface area secured thereon is integrated to this holder. Heat generated in the solid light sources is usually absorbed and released by the heat sink thereby such that the solid light sources can achieve stable emission. In additional cases, a cooling fan is employed at times to blow the heat sink for efficient cooling.

However, in the case a double digit number of solid light sources are disposed two-dimensionally (for example, 9 solid light sources are disposed in a 3 line by 3 column matrix), solid light sources arrayed in a peripheral edge portion of the substrate differ in their cooling effects with solid light sources arrayed in a more central side of the substrate.

Specifically, solid light sources at the center are influenced by heat of solid light sources at the peripheral edge portion. Therefore, cooling is not sufficient leading to unstable emitting light or shorter life cycle. Prior art is problematic from these viewpoints. In addition, in order for cooling efficiency to be sufficient, a heat sink large enough than the arrayed area can be disposed in correspondence but downsizing is not possible.

In addition, as disclosed in JP-Hei 11-27472A, attempts are made to increase the arrayed number of solid light sources. JP-Hei 11-27472A discloses an image recording device comprised of a first solid light source group (semiconductor laser group 1) that projects a first plurality of laser beams, a second solid light source group (semiconductor laser group 2) that projects a second plurality of laser beams. In this case of JP-Hei 11-27472A, the first laser beam is transmitted, the second laser beam is reflected. The transmitted first laser beam and the reflected second laser beam are combined by a combining unit.

This combining unit of the image recording device includes a light transmittance member that transmits the first laser beam from one surface side to another surface side. On the another surface side of the light transmittance member, a plurality of small area sized light reflecting mirrors (areas that reflect laser beams by reflection coating) are disposed.

Then the image recording device can include a first light source unit by disposing a first plurality of semiconductor laser elements (semiconductor LED) as the first solid light source group on a first substrate and a second light source unit by disposing a second plurality of semiconductor laser elements (semiconductor LED) as the second solid light source group on a second substrate.

However, the first solid light source group used as transmitting light and the second solid light source group used as reflecting light respectively have light source arrayed two dimensionally. Therefore, for this reason, if high output solid light sources are used as the first and the second solid light source groups, the degree of cooling between solid light sources at the peripheral portion of each light source unit and solid light sources internal to the peripheral portion differs. Thereby the issue of unable to obtain a stable output cannot be cancelled.

SUMMARY OF THE INVENTION

An object of the present invention is to efficiently cool a light source unit disposed with a plurality of solid light sources such that stable illumination light can be obtained therein. The present invention is purported to provide an illumination light beam forming device, an illumination light source device and an image display device as such.

To accomplish the above object, an illumination light beam forming device according to one embodiment of the present invention includes a first light source unit projecting a ring shaped light beam group, a second light source unit projecting light beams including a case the light beams being group, a combining unit for combining the light beam group projected from the first light source unit and light beams projected from the second light source unit, the combing unit includes a reflecting part formed able to reflect one of the light beam groups, a transmitting part disposed able to transmit the other one of the light beam groups, light beams projected from the second light source unit are disposed at an internal side of the light beam groups projected from the first light source unit when the two light beam groups are viewed from a plane including the reflecting part.

In addition, this illumination light beam forming device can be used for an illumination light source device as well as an image display device.

BRIEF DESCRIPTION OF THE DRAWINGS

FIGS. 12A, 12B are explanatory views that illustrate another example of the second light source unit.

DETAILED DESCRIPTION OF THE PREFERRED EMBODIMENTS

Preferred embodiments of the present invention are described hereinbelow in detail with reference to the accompanying drawings.

(Embodiment 1)

[Constitution]

[Overall Constitution in Outline]

Figure 1:
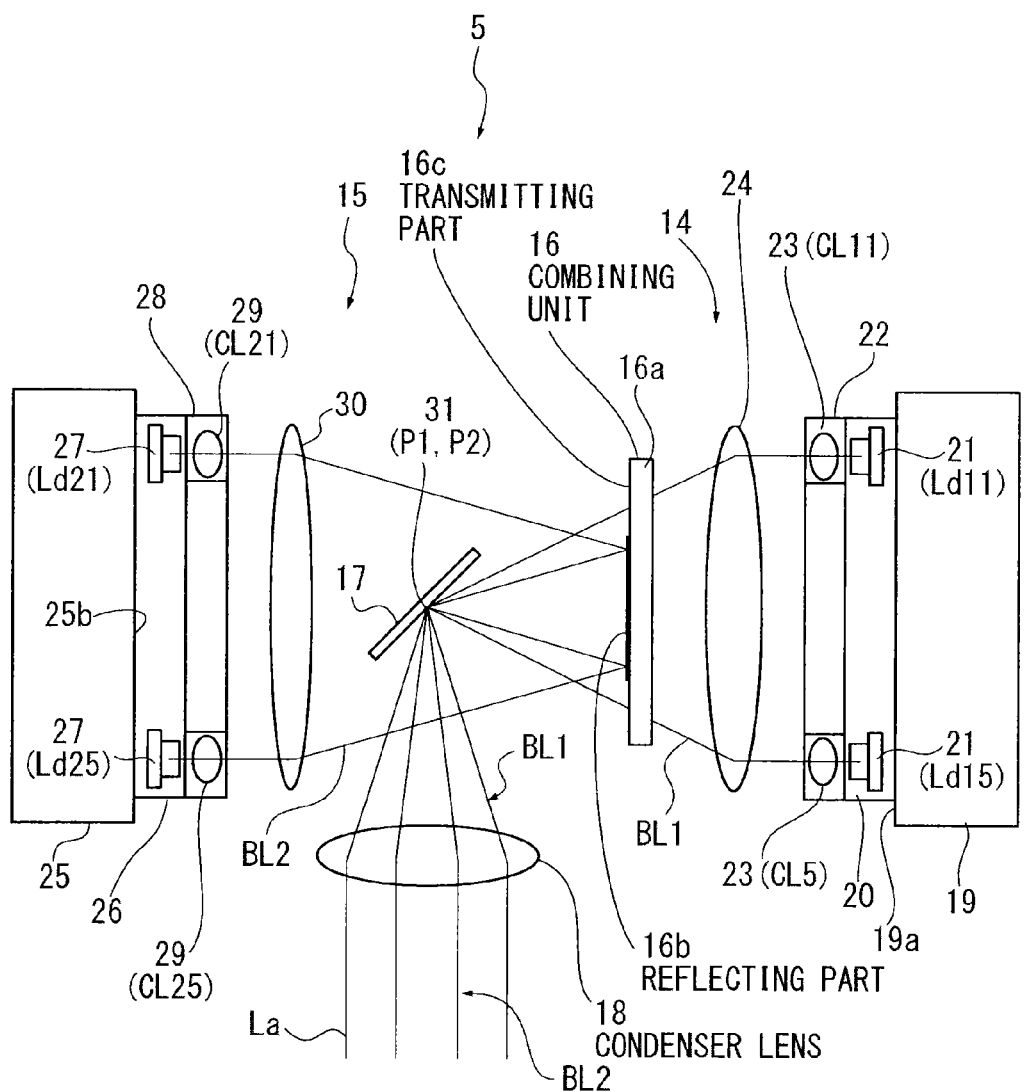
FIG. 1 is an explanatory view that illustrates an embodiment of an illumination light beam forming device related to the present invention.
Figure 2A:
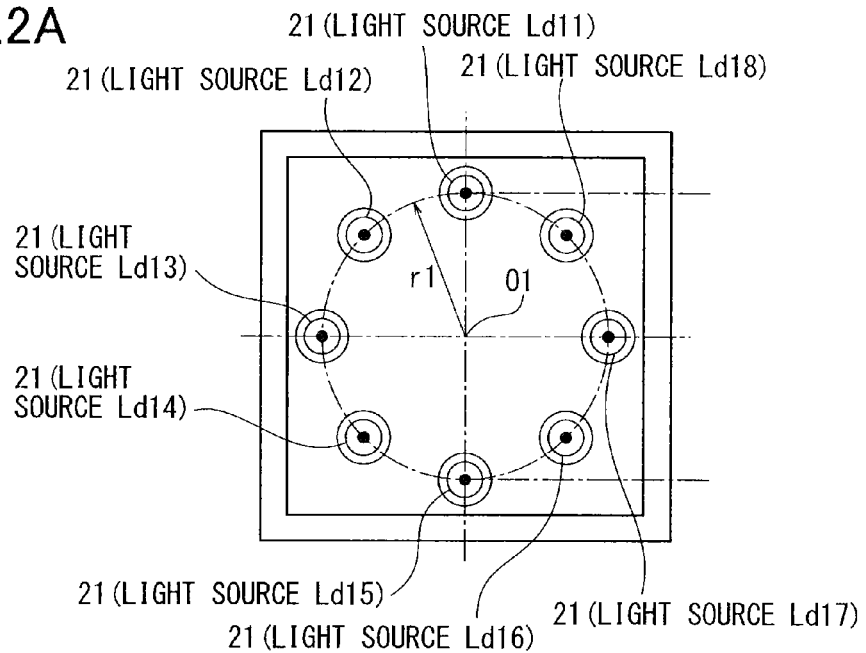
FIG. 2A is an explanatory view that illustrates a first light source unit of FIG. 1.
Figure 2B:
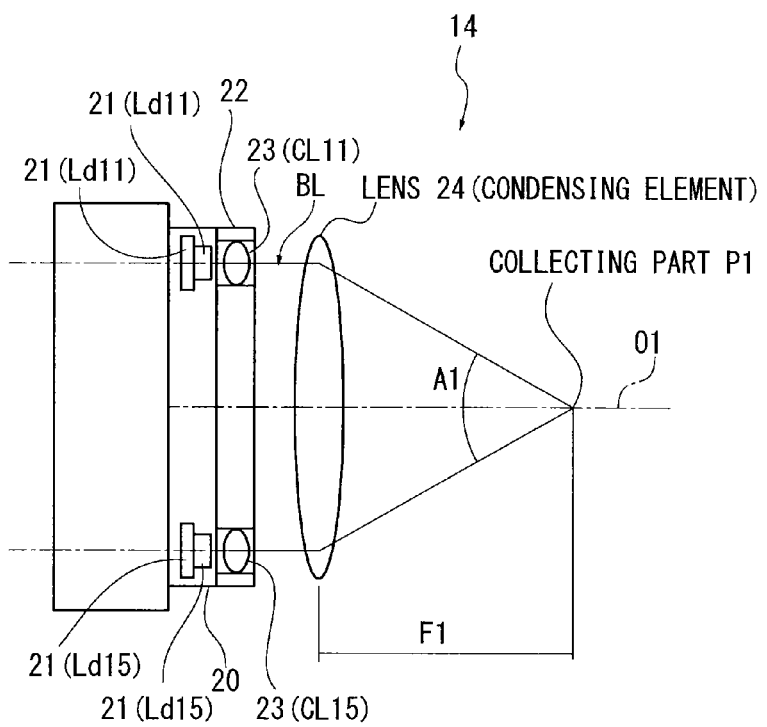
FIGS. 2B, 2C are explanatory views that illustrate a collimator lens of the first light source unit of FIG. 1.
Figure 2C:
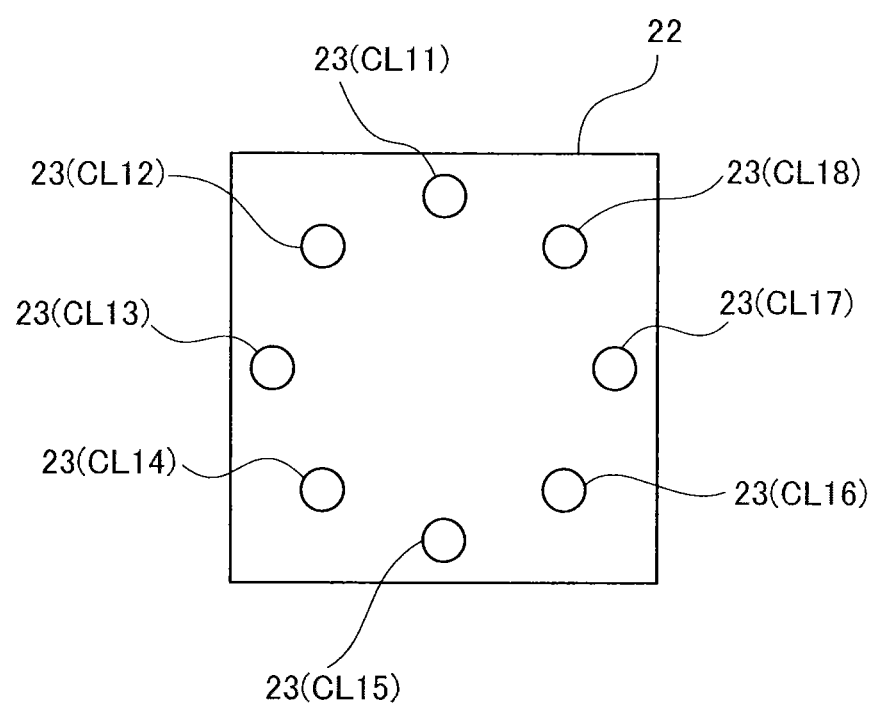
Figure 3A:
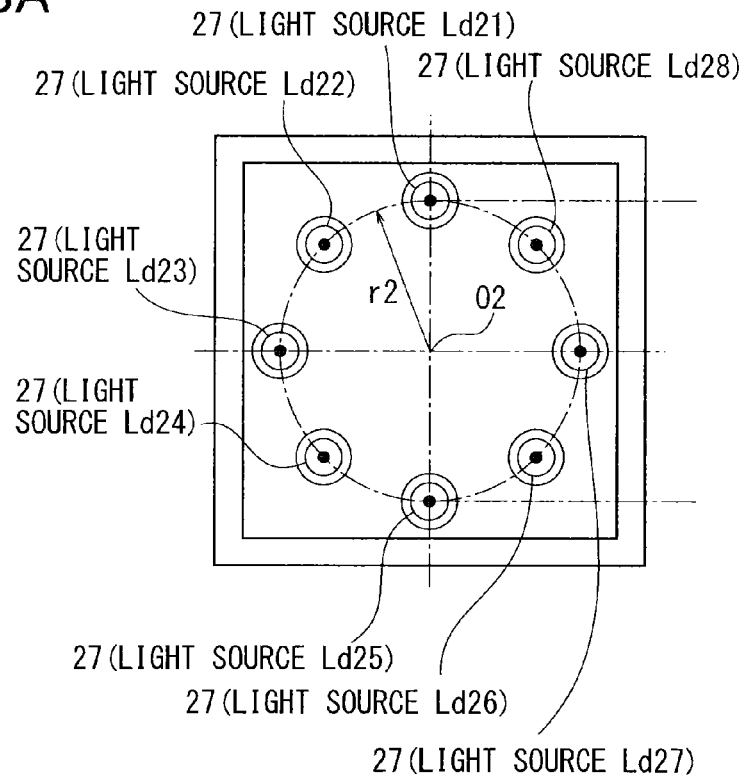
FIG. 3A is an explanatory view that illustrates a second light source unit of FIG. 1.

FIG. 1 illustrates Embodiment 1 of the illumination light beam forming device related to the present invention. FIG. 2A illustrates a first light source unit of FIG. 1. FIGS. 2B, 2C illustrate a collimator lens of the first light source unit of FIG. 1. FIG. 3A illustrates a second light source unit of FIG. 1.

Figure 3B:
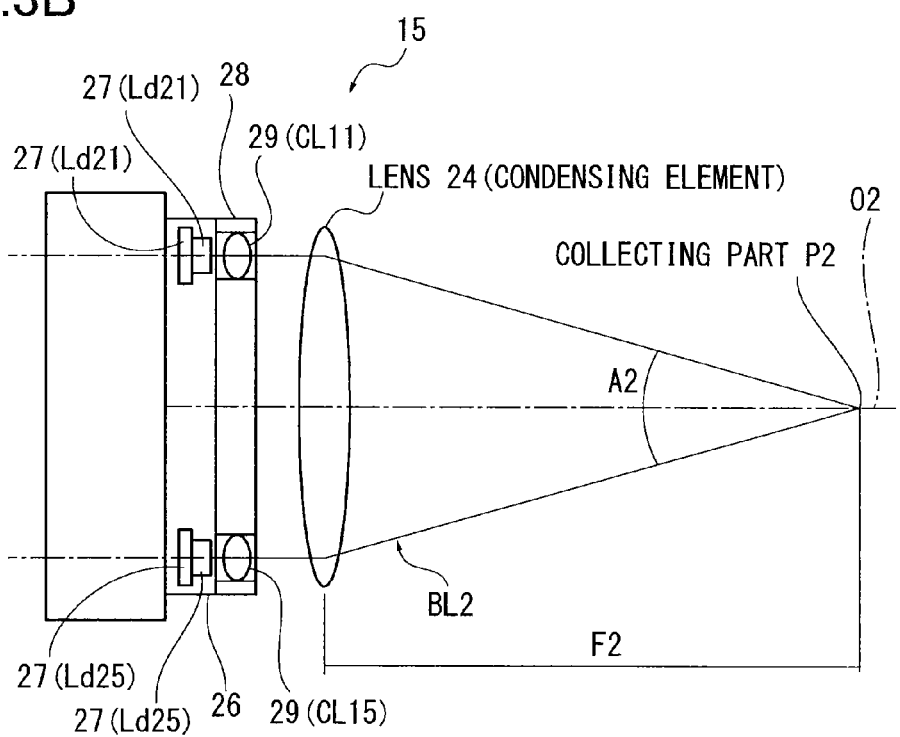
FIGS. 3B, 3C are explanatory views that illustrate a collimator lens of the second light source unit of FIG. 1.
Figure 3C:
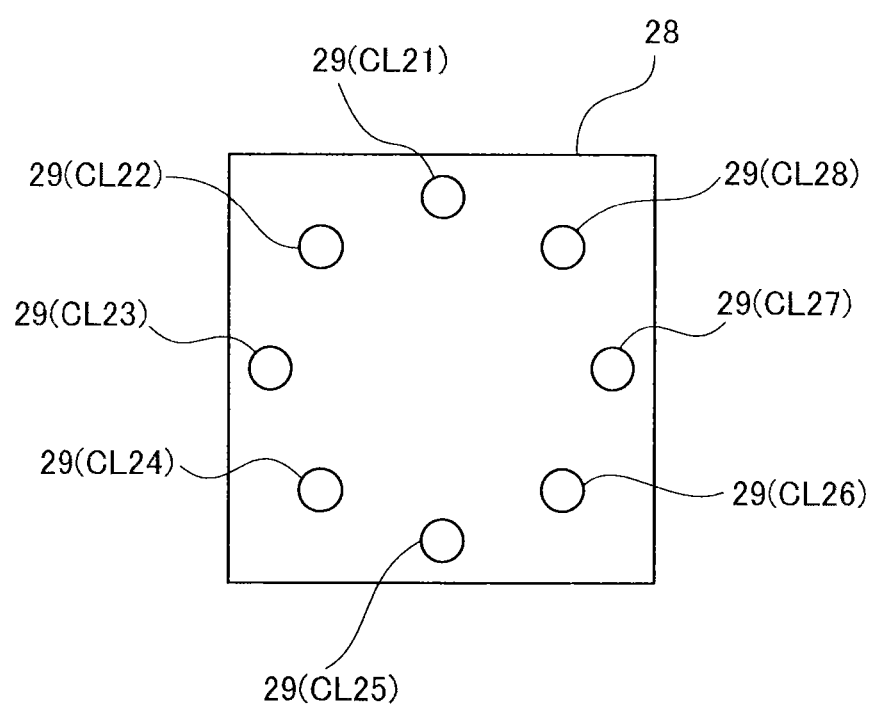
Figure 4:
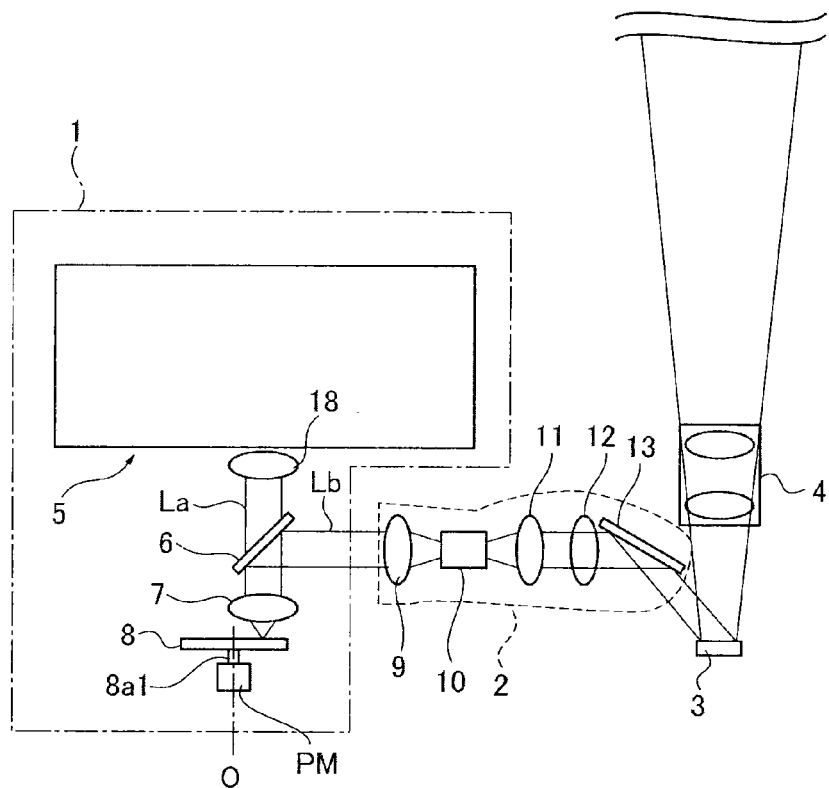
FIG. 4 is an explanatory view that illustrates a projector (image forming device) using an illumination light source device disposed with the illumination light beam forming device of FIG. 1.
Figure 5:
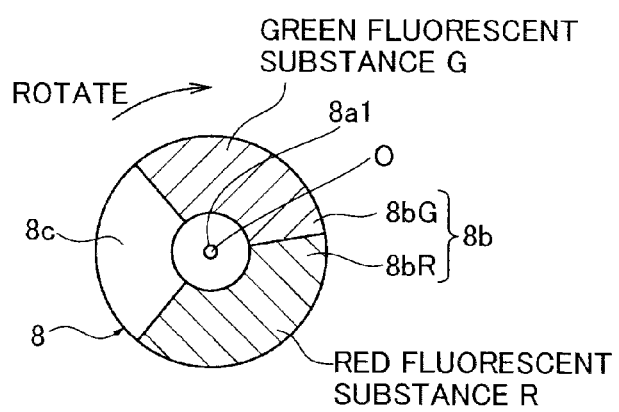
FIG. 5 is an explanatory view that illustrates a fluorescent substance wheel of the illumination light source device as illustrated in FIG. 4.

FIGS. 3B, 3C illustrate a collimator lens of the second light source unit of FIG. 1. FIG. 4 illustrates a projector (image forming device) using the illumination light source device comprising the illumination light beam forming device of FIG. 1. FIG. 5 illustrates a fluorescent substance wheel of the illumination light source device as illustrated in FIG. 4.

[Image Forming Device]

A projector, that is, a projector system as the image forming device of FIG. 4 comprises an illumination light source device 1, an illumination light guiding optical system 2 that guides an illumination light generated from the illumination light source device 1, an image forming element (image forming unit) 3 that projects light beams. The light beams projected by the image forming element are used for imaging because the image forming element is illuminated by an illumination light guided by the illumination light guiding optical system 2. The image forming device also includes a projection lens (an image projection unit which is an image projection unit) 4 that projects light beams onto a projection surface of a screen or the like not illustrated hereby. The light beams are hereby projected from the image forming element 3 and used for imaging.

(Illumination Light Source Device 1)

Illumination light source device 1 includes an illumination light beam forming device 5 that forms and projects an illumination light beam La, a dichroic mirror 6 that transmits an illumination light beam projected from the illumination light beam forming device 5, a lens (optical element 7) that focuses the illumination light beam La transmitted by the dichroic mirror 6 and a fluorescent substance wheel 8 as a wavelength converting member disposed at a collecting point (collecting part) of the lens 7. This light beam La is projected into the fluorescent substance wheel 8 and then projected out from the fluorescent substance wheel 8, after being guided by the dichroic mirror 6 via the lens (condensing element) 7, it is reflected by the dichroic mirror 6 to become illumination light beam Lb.

The dichroic mirror 6 reflects and transmits blue laser beams, reflects blue and red light beams whereas the dichroic mirror 6 can also be changed to a half mirror.

The fluorescent substance wheel 8 includes a circular disc shaped substrate 8a as illustrated in FIG. 5, a wavelength converting member 8b disposed on this substrate 8a as well as a light reflecting unit 8c not disposed with the fluorescent substance. More than one type of wavelength converting member is used in this wavelength converting member 8b as materials of the wavelength converting member. Fluorescent substance is used for this wavelength converting material.

YAG (Yttrium Aluminum Garnet) series green, fluorescent substance having yellow-green colored emitting color, green of sialon series and a red fluorescent substance or the like are proper as the fluorescent substance.

In the Embodiment 1, the wavelength converting member 8b includes a green wavelength converting member (green wavelength conversion area) 8bG of a green fluorescent substance (wavelength converting member) G, a red wavelength converting member (red wavelength conversion area) 8bR of a red fluorescent substance (wavelength converting member) R. This green wavelength converting member 8bG is made of a reflecting layer (not illustrated hereby) disposed on a back surface of the green fluorescent substance G. The red wavelength converting member 8bR is made of a reflecting layer (not illustrated hereby) disposed on a back surface of the red fluorescent substance R. In addition, a green fluorescent substance that emits green fluorescent light with blue laser light as the excited light is used as the fluorescent substance of the green wavelength converting member 8bG. A red fluorescent substance that emits red fluorescent light with blue laser light as the excited light is used as the fluorescent substance of the red wavelength converting member 8bR. Furthermore, the light reflecting unit 8c is constituted to reflect blue laser beams.

Then if a rotating center of a rotating shaft 8a1 of the substrate 8a is set as O, the green wavelength converting member 8bG, the red wavelength converting member 8bR and the light reflecting unit 8c are formed to a sector shape (in the shape of a fan) with an interval of 120 degrees in a circumferential direction with the rotating center O as the center.

The rotating shaft 8a1 of this substrate 8a is driven to rotate around a pulse motor PM (the driving device is a driving motor). By rotating the substrate 8a through the pulse motor PM, the three areas of the green wavelength converting member 8bG, the red wavelength converting member 8bR and the light reflecting unit 8c of the substrate 8a are switched over. They are disposed vis-à-vis the collecting part. The collecting part is made to collect illumination light. In such a way, the fluorescent substance wheel 8 is constituted to have three areas. Thereby primary colors of green, red and blue can be projected in time sequence by rotation.

(Illumination Light Guiding Optical System 2)

The illumination light guiding optical system includes a lens (an optical condensing element) 9 that collects the light beam Lb reflected by the dichroic mirror 6, a light tunnel to which light beams from the lens 9 are projected into, relay lenses 11, 12 that guide the light beams projected from the light tunnel 10 (optical condensing elements) and a mirror (optical element) 13 that projects light beams guided by the relay lenses 11, 12 toward the image forming element 3. By such a constitution, the illumination light guiding optical system 2 is configured to guide uniformly and efficiently the illumination light of the three primary colors from the fluorescent substance wheel 8 to the image forming element 3.

In addition, the color of illumination light projected from the fluorescent substance wheel 8 into the image forming element 3 via the illumination light guiding optical system 2 can be changed following time sequence by controlling the rotating number per unit time of the fluorescent substance wheel 8. On the other hand, in the case the items to be displayed are images of a particular color in correspondence to the timing of color changes of incident illumination light, in order to display via the projector lens 4 on a display surface of a screen or the like, the image forming element 3 performs operation control of the pixels such that only light from pixels corresponding to image information of that particular color is projected into the projecting lens 4.

This projecting lens 4 is configured to project in enlargement the incident images of each color from the image forming device 3. Then the image forming device 3 switches over in sequential high speed image light beams of each color. The projecting lens 4 can project in enlargement on a display surface of a screen or the like. Therefore, full color image display can be possible on the display surface.

[Image Forming Element]

In the Embodiment 1, a digital micro mirror device or DMD is used for image forming device 3. The DMD has a structure in which micro mirrors used as pixels are arrayed two dimensionally in plurality thereof. Micro mirrors as pixels are performed gradient control by electrostatic control thereof in correspondence to pixels of image data. Thereby the image light beams directed towards the projecting lens are formed. This technical art is well known such that a detailed explanation is abbreviated hereby.

In addition, in the Embodiment 1, a mirror array device, that is, DMS is used as an image generating part in which pixels in a two dimensional matrix shape are arrayed in the image forming element 3. But it is not limited to the mirror array device (DMD) as such. For example, a liquid crystal panel of a reflecting type, a liquid crystal panel of a transmitting type can also be used. If the liquid crystal panel of this transmitting type is used, a proper disposition of an incident lens and a projecting lens for illumination light can be employed. Such a disposition is proper for the liquid crystal panel of the transmitting type. In addition, it is needless to say that by adding a polarization converting member that unifies polarization of illumination light, an illumination with high efficiency can be achieved.

(Illumination Light Beam Forming Device 5)

In addition, the illumination light beam forming device 5, as illustrated in FIG. 1, comprises a first light source unit 14 and a second light source unit 15, a light combining plate (light beam combining member) 16 that combines a first light beam group BL1 from the first light source unit 14 and a second light beam group BL2 from the second light source unit 15, a folding back mirror 17 that takes out the light beam combined by the light combining plate 16, a lens (condensing element) 18 that projects in parallel light beams the light beams taken out by the folding back mirror 17.

If the first light source unit 14 and the second light source unit 15 are disposed in opposition in such a way, the second light beam group BL2 of the combined light beam is in a returning direction against the second light source unit 15. Therefore, the folding back mirror is disposed as a reflecting member between the combining member and the light source unit. Thus light beams are taken out in a lateral direction (a direction downwards in FIG. 2) against the opposing direction.

The first light source unit 14 and the second light source unit 15 are disposed to be mutually opposed with an interval. Therefore, the first light beam group BL1 and the second light beam group BL2 are projecting to each other mutually.

(The First Light Source Unit 14)

This first light source unit 14, as illustrated in FIG. 1 and FIG. 2B, comprises a heat sink 19, a light source holder 20 disposed on a flat installing surface 19a of the heat sink 19, a plurality of (multiple) solid light sources 21 held by the light source holder 20 and disposed discretely in ring shape as illustrated in FIG. 2A, a lens holder 22 disposed on the light source holder 20, a plurality of collimator lenses 23 held on the lens holder 22 and disposed respectively in correspondence to each solid light sources 21 as well as a condenser lens 24 as an condensing element that collects light beams projected from the plurality of collimator lenses 23 to a collecting part P1 at a position of focal point distance F1.

In the Embodiment 1, as illustrated in FIGS. 2A to 2C, a light source Ld11, a light source Ld12 through a light source Ld18 of for example, a semiconductor laser light source or the like are employed as the plurality of solid light sources 21. The light source Ld11, the light source Ld12 through the light source Ld18 are disposed discretely in ring shape. Also, centers of the light source Ld11, the light source Ld12 through the light source Ld18 are made to align on a radius r1 with its center being the light axis O1 of the condenser lens 24. In addition, in the Embodiment 1, a light source that emits blue laser light is used for the light source Ld11, the light source Ld12 through the light source Ld18.

In addition, in the Embodiment 1, a plurality of collimator lenses 23 are employed to array in ring shape as illustrated in FIG. 2A as CL11, CL12 through CL18. CL11, CL12 through CL18 are disposed on a light projecting side respectively in correspondence to the light source Ld11, the light source Ld12 through the light source Ld18.

In addition, in FIGS. 2A to 2C, light beams from the solid light sources 21 are condensed to a single point located at a position of a focal point distance F1 of the condenser lens 24. However, a positional relationship between the collimator lenses 23 of the solid light sources 21 can certainly generate individual variations. But considerations are given to such variations. Therefore, hereby light beams become a spot size of finite largeness to be collected.

[The Second Light Source Unit 15]

As illustrated in FIG. 1 and FIG. 3A, the second light source unit 15 comprises a heat sink 25, a light source holder 26 disposed on a flat installing surface 25b of the heat sink 25, a plurality (multiple) solid light sources 27 held by the light source holder 26 and disposed discretely in ring shape, a lens holder 28 disposed on the light source holder 26, a plurality of collimator lenses 29 held on the lens holder 28 and disposed respectively in correspondence to each solid light sources 27 as well as a condenser lens 30 as an condensing element that focuses light beams projected from the plurality of collimator lenses 29 to a collecting part P2 at a position of focal point distance F2.

In the Embodiment 1, as illustrated in FIG. 3A, a light source Ld21, a light source Ld22 through a light source Ld28 of for example, a semiconductor laser light source or the like are employed as the plurality of solid light sources 27. The light source Ld21, the light source Ld22 through the light source Ld28 are disposed discretely in ring shape. Also, centers of the light source Ld21, the light source Ld22 through the light source Ld28 are made to align on a radius r2 with its center being the light axis O2 of the condenser lens 30. In addition, in the Embodiment 1, a light source that emits blue laser light is used for the light source Ld21, the light source Ld22 through the light source Ld28.

In addition, in the Embodiment 1, a plurality of collimator lenses 29 are employed to array in ring shape as illustrated in FIG. 3A as CL21, CL22 through CL28. CL21, CL22 through CL28 are disposed on a light projecting side respectively in correspondence to the light source Ld21, the light source Ld22 through the light source Ld28.

In addition, in FIG. 3B, light beams from the solid light sources 21 are condensed to a single point located at a position of a focal point distance F1 of the condenser lens 24. However, positional relationship between the collimator lenses 23 and the solid light sources 21 can generate individual variations. But considerations are given to such variations. Therefore, hereby light beams become spot sizes of finite largeness to be collected.

As described above, the focal point distance F1 of the condenser lens 24 in the first light source unit 14 is set to be different with the focal point distance F2 of the condenser lens 30 in the second light source unit 15.

(Light Combining Plate 16)

The light combining plate (light beam combining member) 16 as this light combining unit (light combining device) has a constitution disposed with a circular shaped reflecting part (light reflecting part) 16b at the center of a translucent plate 16a and a transmitting part (light transmitting part) 16c at a side of a circumferential edge portion of the translucent plate 16a.

In addition, as illustrated in FIG. 1, light beams projected from the plurality of solid light sources 21 of the first light source unit 14 transmit through the translucent plate 16a and focuses towards a collecting part 31 situated at a single point. The translucent plate 16a is disposed around the reflecting part 16b. While light beams projected from the plurality of solid light sources 27 of the second light source unit 15 are reflected by the reflecting part 16b to focus towards a collecting part 31 situated at a single point. The first light source unit 14 and the second light source unit 15 are disposed against the light combining plate 16 in a way that a position of the focal point distance F1 of the first light source unit 14 and a position of the focal point distance F1 of the second light source unit 15 are made to coincide.

Hereby an angle A1 of the first light beam group BL1 is set. The two light sources most separated from each other (for example, light sources Ld11 and Ld15 in FIG. 1 and FIG. 2B) among the plurality of solid light sources 21 of the first light source unit 14 focus to a collecting part P1 at a position of the focal point distance F1. This angle is set as the angle A. In addition, an angle A2 of the second light beam group BL2 is set. The two light sources most separated from each other (for example, light sources Ld21 and Ld25 in FIG. 1 and FIGS. 3A to 3C) among the plurality of solid light sources 27 of the second light source unit 15 focus to a collecting part P2 at a position of the focal point distance F2. This angle is set as an angle A2. Furthermore, the focal point distance F1 of the condenser lens 24 of the first light source unit 14 is set to be a value smaller than the focal point distance F2 of the condenser lens 30 of the second light source unit 15 such that the angle A1 of the first light source group BL1 of the first light source unit 14 can be larger than the angle A2 of the second light source group BL2 of the second light source unit 15.

Therefore, light beams projected from the plurality of solid light sources 27 of the second light source unit 15 and reflected by the reflecting part 16b of the light combining plate 16 are set as the second light beam group BL2. Light beams projected from the plurality of solid light sources 21 of the first light source unit 14 and transmitted through the light combining plate 16 are set as the first light beam group BL1. The second light beam group BL2 are disposed at an internal side to the first light beam group BL1.

[Effect]

Next, effects of an illumination light source device 1, an illumination light beam forming device 5 of the illumination light source device 1 and an image forming device constituted as such are described.

Spot shaped blue laser light beams projected from each of the plurality of solid light sources 21 of the first light source unit 14 form the first light beam group BL1. These laser light beams project into the condenser lens 24 as parallel light beams via each of the corresponding collimator lenses 23. Such laser light beams are refracted by this condenser lens 24, transmits through the light combining plate 16 to be condensed to a light collecting part P1 of the focal point distance F1.

On the other hand, spot shaped blue laser light beams projected from each of the plurality of solid light sources 27 of the second light source unit 15 form the second light beam group BL2. These laser light beams project into the condenser lens 30 as parallel light beams via each of the corresponding collimator lenses 29. Such laser light beams are refracted by this condenser lens 30, reflected by the reflecting part 16b of the light combining plate 16 to be condensed to a light collecting part P2 (coincides with the collecting part P1) of the focal point distance F2.

In this case, the second light beam group BL2 of the second light source unit 15 is reflected by the reflecting part 16b. It is thereafter situated at an internal side than the first light beam group BL1. The first light beam group BL1 is comprised from a plurality of light beams projecting from the plurality of solid light sources 21 of the first light source unit 14. Then the first light beam group BL1 and the second light beam group BL2 are reflected by a folded back mirror 17 disposed in the collecting part P1 (coincides with the collecting part P2). Then the first light beam group BL1 and the second light beam group BL2 project into a lens 18 side. The light beams are then made to illumination light beams La of parallel light beams by the lens 18 and projected out from the illumination light beam forming device 5.

The illumination light beam La is condensed by the lens 7 after transmitted through the dichroic mirror 6 and then condensed to the fluorescent substance wheel 8. The fluorescent substance wheel 8 is a wavelength converting member. In this case, when the fluorescent substance wheel 8 is made to rotate, as soon as blue laser light beams are projected into the green wavelength converting part (green wavelength converting area) 8bG of the fluorescent substance wheel 8, green wavelength converting part 8bG is excited. Therefore, a green colored illumination light beam is projected from the green wavelength converting part 8bG. When the fluorescent substance wheel 8 is made to rotate, as soon as blue laser light beams are projected into the red wavelength converting part (green wavelength converting area) 8bR of the fluorescent substance wheel 8, red wavelength converting part 8bR is excited. Therefore, a red colored illumination light beam is projected from the red wavelength converting part 8bR. Furthermore, when the fluorescent substance wheel 8 is made to rotate, as soon as blue laser light beams are projected to the light reflecting part 8c of the fluorescent substance wheel 8, the blue laser light beams are reflected by the light reflecting part 8c. Therefore, blue illumination light beams are projected form the fluorescent substance wheel 8.

This fluorescent substance wheel 8 is performed rotation control at high speed. Therefore, each of the light beams of R (red), G (green) and B (blue) are switched over by a determined time interval therein. Each of them is then projected. The illumination light beams projected by such switch over become parallel light beams by the lens 18. The light beams are reflected by the dichroic mirror 6 to become illumination light beams Lb.

This illumination light beam Lb is guided by the illumination light guiding optical system 2 and projects into the image forming element 3. In the image forming element 3, in correspondence to a timing at which colors of incoming illumination light change, in order for the image of that color to be displayed on a display surface of a screen or the like via the projecting lens 4, the micro mirrors as pixels are performed gradient control. Therefore, only light from pixels corresponding to image information of that particular color is guided to the projecting lens 4 and can project into the projecting lens 4.

That is, in the image forming element 3, a plurality of matrix shaped pixels (micro mirrors) are gradient controlled. Therefore, only light from pixels (micro mirrors) corresponding to image information of R (red) is guided to the projecting lens 4 when illumination light beams of R (red) are incident. Only light from pixels (micro mirrors) corresponding to image information of G (green) is guided to the projecting lens 4 when illumination light beams of G (green) are incident. Only light from pixels (micro mirrors) corresponding to image information of B (blue) is guided to the projecting lens 4 when illumination light beams of B (blue) are incident. The light beams of R (red), G (green) and B (blue) entering the image forming element 3 is switched over at high speed by every determined time interval.

Then images guided from the image forming element 3 to the projecting lens 4 and entering by each color are projected in enlargement on a display surface of a screen or the like by the projection lens 4. Thereby a color image is formed on the display screen.

In addition, in the light combining plate 16 as the combining unit, the ring shaped reflecting part can be disposed at its periphery. A folded back mirror 17 for taking out light beams can be disposed not close to the collecting part 31. Light beams are converted to parallel light beams by the lens 18. The lens 18 is a condensing element but condensing is not always necessary. In addition, light take out in a same direction is one of the chief purposes of the present invention. Therefore, proper choices can be made by optical systems disposed thereafter.

Figure 6:
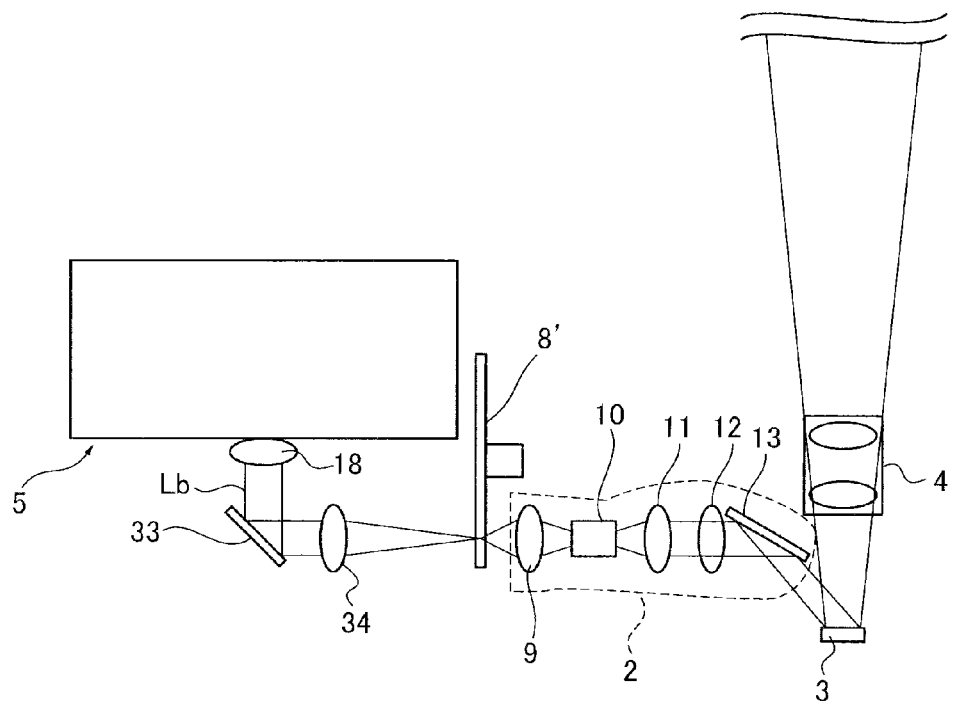
FIG. 6 is an explanatory view that illustrates a modified example of a projector (image forming device) using the illumination light source device disposed with the illumination light beam forming device of FIG. 1.
Figure 7:
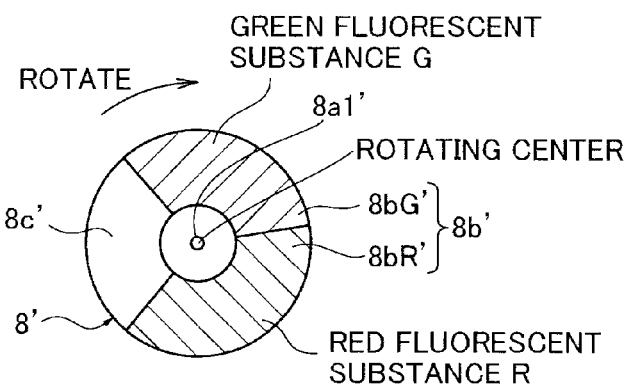
FIG. 7 is an explanatory view that illustrates a fluorescent substance wheel of the illumination light source device as illustrated in FIG. 6.

(Modified Example) FIG. 6, FIG. 7

For the above described Embodiment 1, the fluorescent substance wheel 8 of a reflecting type is explained but it is not necessarily limited to such. For example, as illustrated in FIG. 6, illumination light beams projected out from the illumination light beam forming device 5 can also project into a fluorescent substance wheel 8' through a mirror 33 and a condenser lens 34. The fluorescent substance wheel 8' can hereby be a transmitting type.

This fluorescent substance wheel 8', as illustrated in FIG. 7, includes a circular disc shaped translucent substrate 8a', a wavelength converting part 8b' disposed on the substrate 8a and a light transmitting part 8c' not disposed with the fluorescent substance. Wavelength converting materials of one kind or more is used as the wavelength converting member in this wavelength converting part 8b'. Wavelength converting part 8b' of the present Embodiment 1 can include a green wavelength converting part (green wavelength converting area) 8bG' of a green fluorescent substance (wavelength converting member), a red wavelength converting part (red wavelength converting area) 8bR' of a red fluorescent substance (wavelength converting member). The same fluorescent substances with the green wavelength converting part 8bG and the red wavelength converting part 8bR of the above described Embodiment 1 are respectively used for this green wavelength converting part 8bG' and red wavelength converting part 8bR'.

In this modified example, light beams of R (red), G (green) and B (blue) generated at the fluorescent substance wheel 8' and projected out are incident into the illumination light guiding optical system 2. 8a1' is a rotating shaft of the fluorescent substance wheel 8'.

Figure 8:
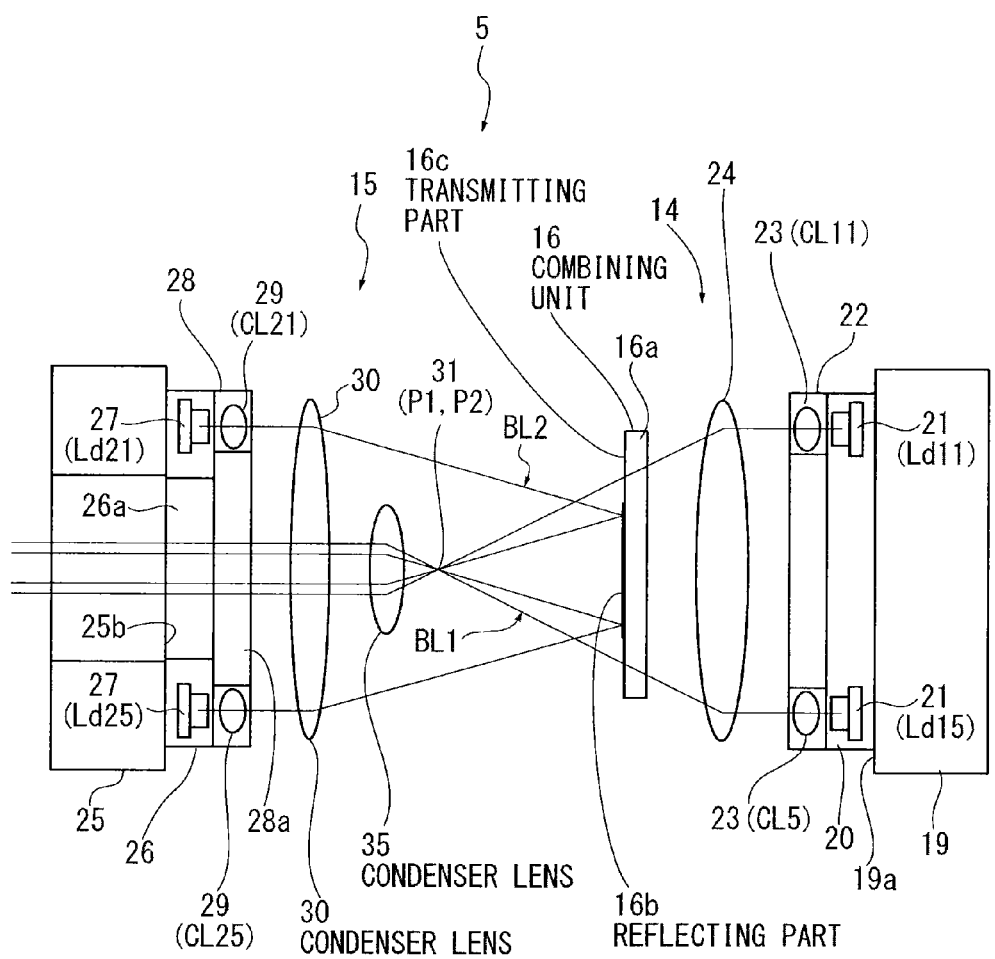
FIG. 8 is an explanatory view that illustrates another embodiment of the illumination light beam forming device of FIG. 1.

(Embodiment 2) FIG. 8

In FIG. 8, the folded back mirror 17 and the lens 18 of the illumination light beam forming device 5 of the Embodiment 1 are abbreviated. This example also illustrates a case in which the combined light beams are projected out from a side close to the heat sink 25 of the second light source unit 15.

In the illumination light beam forming device 5 of Embodiment 2, perforated parts 25a, 26a, 28a are formed respectively on the center of the heat sink 25, the light source holder 26 and the lens holder 28. In addition, a condenser lens (condensing element) 35 is disposed between the light combining plate 16 (light combining unit) and the condenser lens 30 to be situated at a more internal side than the second light beam group BL2. Then the first light beam group BL1 and the second light beam group BL2 combined by the light combining plate 16 (light combining unit) and condensed by the collecting part 31 are refracted by the condenser lens (condensing element) 35. After converted to parallel light beams by the condenser lens 30, the light beam groups pass through the perforated parts 28a, 26a and 25a and projected out from the side of heat sink 25.

If the illumination light beam forming device 5 of the Embodiment 2 is switched over to the illumination light beam forming device 5 of FIG. 4 and FIG. 6, then a projector (image forming device) can be constituted.

Figure 9:
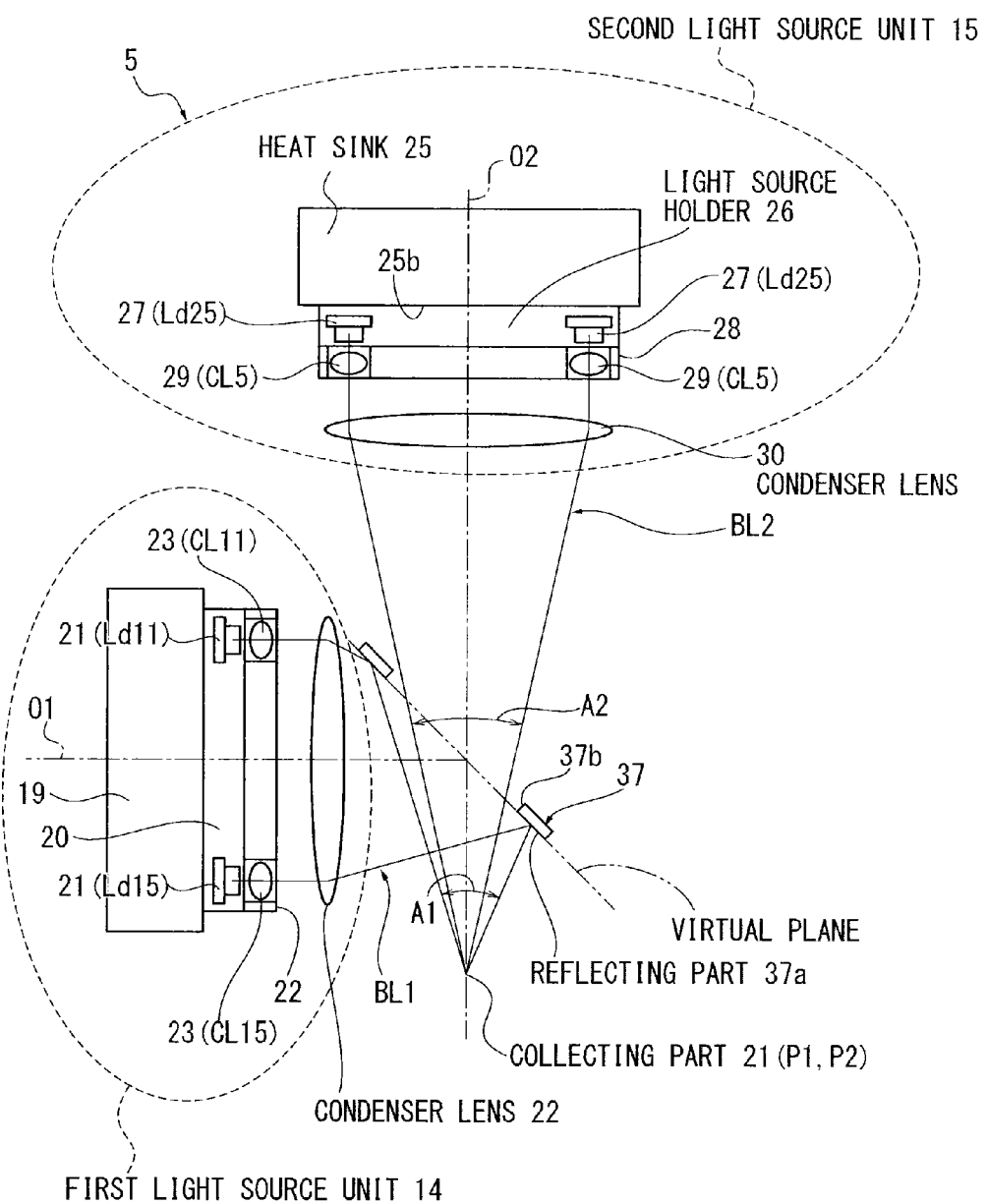
FIG. 9 is an explanatory view that illustrates another embodiment of the illumination light beam forming device.

(Embodiment 3) FIG. 9

In the above described Embodiment 2, an example is illustrated in which the first light source unit 14 and the second light source unit 15 of the illumination light beam forming device 5 are disposed in opposition but it is not limited to such. For example, as illustrated in FIG. 9, a constitution can be adopted in which the first light source unit 14 and the second light source unit 15 are disposed in such a way that projecting directions of the respective illumination light form a mutual 90 degree angle. The first light beam group BL1 of the first light source unit 14 and the second light beam group BL2 of the second light source unit 15 are disposed to condense to the collecting part 31.

In addition, the light combining member (light beam combining unit) uses a ring shaped mirror 37 as the light combining device. A reflecting surface (light reflecting part) 37a of the ring shaped mirror 37 reflects the first light beam group BL1 from the first light source unit 14. The ring shaped mirror 37 is disposed in such a way that a second light beam group BL2 of the second light source unit 15 transmits through a light transmitting hole (light transmitting part) situate at an internal side. In this case, the center of the ring shaped mirror 37 is made to coincide with the light axis O1 of the first light source unit 14 and the light axis O2 of the second light source unit 15. The center also has a gradient of 45 degrees against the light axes O1 and O2 respectively.

In the Embodiment 3, an angle A1 of the first light beam group BL1 of the first light source unit 14 is a minimum angle effected by the bore of the ring shaped mirror 27. No light beams can project from the first light source unit 14 with an angle small enough to deviate from the ring shaped mirror 37. In other words, the bore and width of the ring shaped mirror 37 are set to a dimension satisfying a condition. The condition is for spot shaped light beams projected from the first light source unit 14 to not deviate in a radius direction. In addition, an angle A2 of the second light beam group BL2 of the second light source unit 15 is effected by the radius of the ring shaped mirror 37. The angle A2 is set to be a maximum angle therein. Therefore, in the second BL2 of the second light source unit 15, no light beams can hit the ring shaped mirror 37 at an angle bigger than the angle A2.

Then when viewing the first light beam group BL1 and the second light beam group BL2 from a plane including the ring shaped mirror 37, the first and second light source units 14, 15 are disposed in a way that the second light beam group BL2 is guided to a more internal side than the first light beam group BL1. The ring shaped mirror 37 serves as a reflecting part hereby.

If the illumination light beam forming device 5, as illustrated in the FIG. 9 is switched over to the illumination light beam forming device 5 of FIG. 4 and FIG. 6, then a projector (image forming device) can be constituted.

Figure 10:
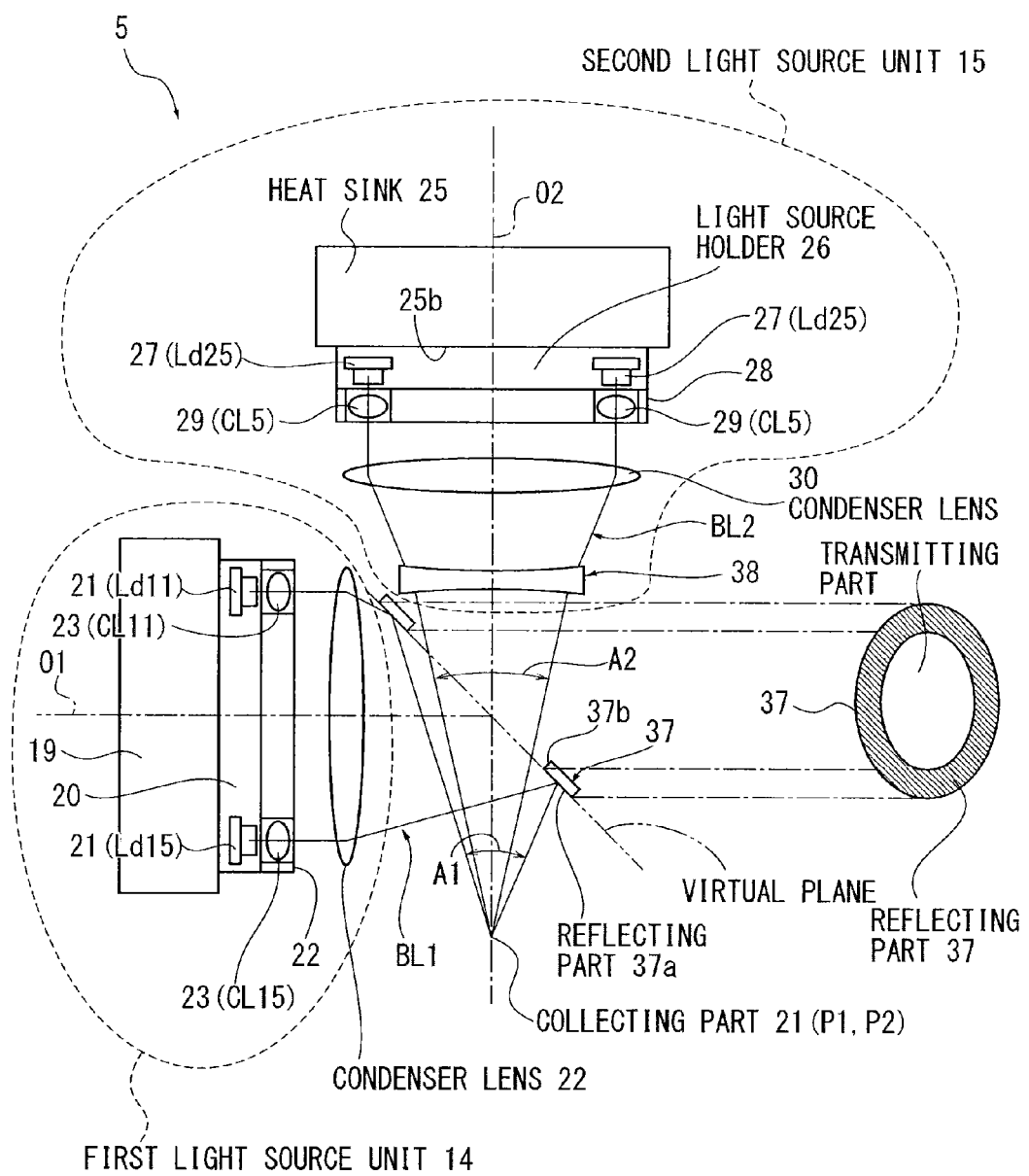
FIG. 10 is an explanatory view that illustrates another embodiment of the illumination light beam forming device.

(Embodiment 4) FIG. 10

FIG. 10 illustrates Embodiment 4 of the illumination light beam forming device 5 of the present invention. In Embodiment 3, a minus condenser lens 38 is disposed between the lens 18 of the second light source unit 15 and the ring shaped mirror 37. An external diameter of the second light beam group BL2 from the second light source unit 15 is made smaller than the external diameter of the second light beam group BL2 in Embodiment 3. In Embodiment 4, as illustrated in FIG. 10, the first and second light source unit 14 and 15 can be disposed more closely than the Embodiment 3. According to this Embodiment 4, the illumination light beam forming device 5 comprising the first and second light source unit 14 and 15 can be made smaller.

If the illumination light beam forming device 5, as illustrated in the FIG. 10 is switched over to the illumination light beam forming device 5 of FIG. 4 and FIG. 6, then a projector (image forming device) can be constituted.

(Embodiment 5) FIGS. 11A and 11B, FIGS. 12A and 12B

In the above described Embodiments 1 through 4, in the illumination light beam forming device 5, the plurality of solid light sources 21 of the first light source unit 14 and the plurality of solid light sources 27 of the second light source unit 15 are disposed in circle shape at an equal pitch interval on a circle of radius r. This is an example of a ring shaped array but it is not necessarily limited to such.

Figure 11A:
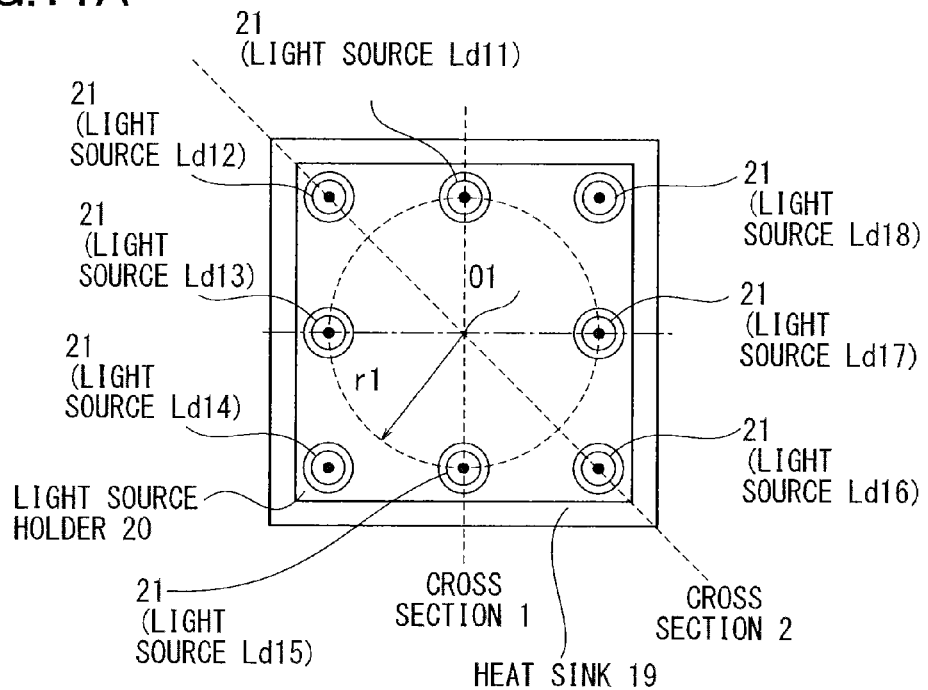
FIGS. 11A, 11B are explanatory views that illustrate another example of the first light source unit.
Figure 11B:
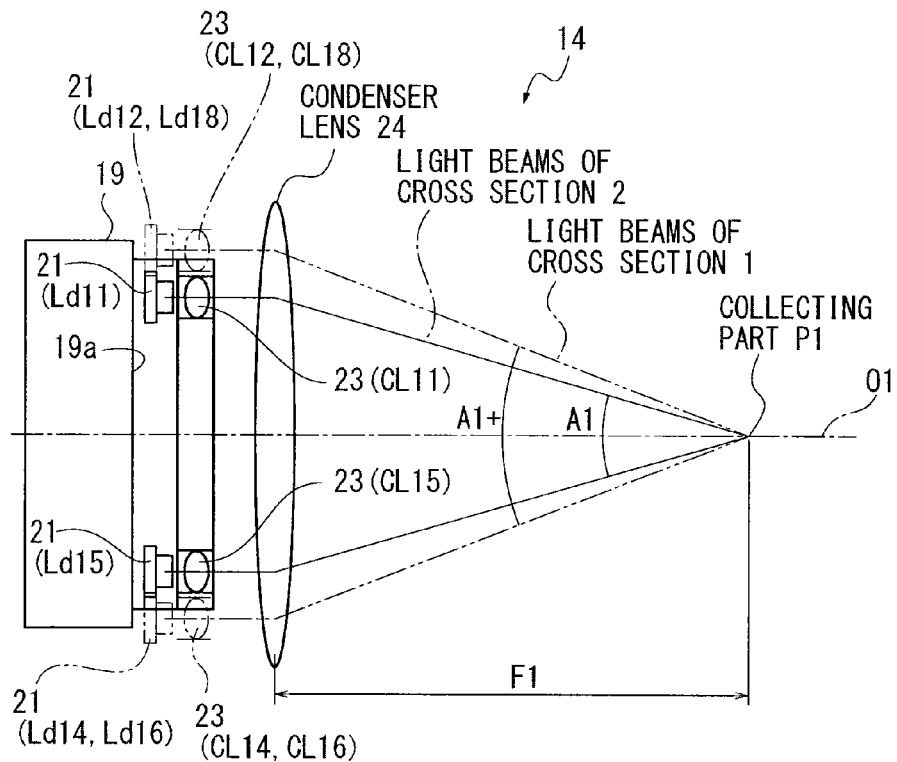

For example, as illustrated in FIGS. 11A, 11B the plurality of light sources 21 of the first light source unit 14 is disposed at an equal pitch interval in square shape. In such a way, the plurality of light sources 21 is arrayed in a shape like a circle. On the other hand, as illustrated in FIGS. 12A, 12B, the plurality of light sources 27 of the second light source unit 15 is disposed at an equal pitch interval in square shape. In such a way, the plurality of light sources 27 is arrayed in a shape like a circle.

In this Embodiment 5, light sources Ld11, Ld13, Ld15 and Ld17 of the plurality of solid light sources 21 are situated on a radius r1 of the light axis O1. Light sources Ld12, Ld14, Ld16 and Ld18 situated at corner areas (angular areas) of the plurality of solid light sources 21 are situated more external than the radius r1.

In addition, light sources Ld22, Ld24, Ld26 and Ld28 situated at corner areas (angular areas) of the plurality of solid light sources 27 are situated on a radius r2 of the light axis O2. Other light sources Ld21, Ld23, Ld25 and Ld27 of the plurality of solid light sources 27 are situated more internal than the radius r2.

In addition, in the first light source unit 14, light beams of light sources Ld11, Ld15 disposed on a cross section 1 of FIG. 11A are condensed to the collecting part P1 at an angle A as illustrated in FIG. 11B. However, an interval of light sources Ld12 and Ld16 disposed on a cross section 2 of FIG. 11A is larger than an interval of light sources Ld11 and Ld15 disposed on a cross section 1 of FIG. 11A. Therefore, light beams of light sources Ld12 and Ld16 disposed on the cross section 1 of FIG. 11A are condensed to the collecting part P1 at an angle A1+ larger than the angle A1. Such light beams are like the light beams of double dot chain lines (broken lines) illustrated in FIG. 11B.

In addition, light beams of Ld22, Ld26 disposed on a cross section 4 of FIG. 12A is condensed to the collecting part P2 at an angle A2 as illustrated in FIG. 12B. However, an interval between the Ld21, Ld25 disposed on a cross section 3 of FIG. 12A is smaller than an interval of Ld22, Ld26 disposed on a cross section 4. Therefore, in the second light source unit 15, light beams of Ld22, Ld26 disposed on the cross section 3 are condensed to a collecting part P2 at an angle A2− smaller than the angle A2. Such light beams are illustrated here by broken lines.

When these first and second light source units 14 and 15 are applied to the Embodiments 3 and 4 of FIG. 9 and FIG. 10, the ring shaped mirror 37 as the combining unit is constituted to have a square form but not a circular form. This square formed ring shaped mirror 37 has a structure that reflects light beams condensed (collected) at angles of A1 through A1+. In such a structure, light beams condensed (collected) at angles A2 through A2− are then transmitted through an internal side of the square formed ring shaped mirror 37.

As stated above, the ring shaped mirror 37 is the combining unit. That is, when viewed from a plane including the ring shaped mirror 37, the second light beam group BL2 projected from the second light source unit 15 of the other side is disposed more internal to the first light beam group BL1 projected from the first light source unit 14 of one side.

In addition, a minimum of the angle A2− can be zero. That is, circular ring array is not a must. If power output is small and sufficient cooling can be obtained, light beam groups can be disposed on a light axis of the condenser lens (condensing element) 30.

An illumination light beam forming device having the first and second light source unit 14, 15 illustrated in this Embodiment 5 can be switched over to an illumination light beam forming device 5 of FIG. 4 and FIG. 6 to constitute a projector (image forming device).

Figure 13:
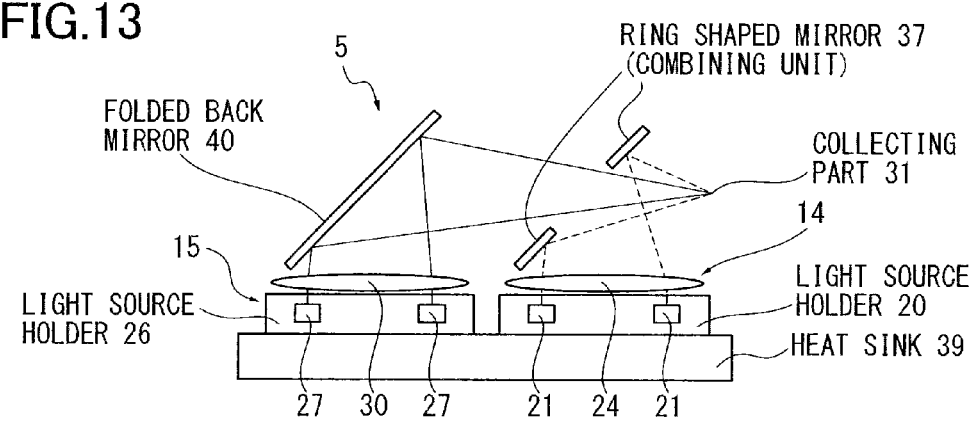
FIG. 13 is an explanatory view that illustrates another example of the illumination light beam forming device.

(Embodiment 6) FIG. 13

In the Embodiment 1 of FIG. 1 through FIG. 5, the first light source unit 14 and the second light source unit 15 of the illumination light beam forming device 5 are disposed in opposition but not necessarily limited to such disposition. For example, as illustrated in FIG. 13, the first light beam group BL1 of the first light source unit 14 and the second light beam group BL2 of the second light source unit can project toward a same direction. In order to achieve such a constitution, the first light source unit 14 and the second light source unit 15 can be arranged concurrently on a single heat sink 39. In this Embodiment 6, a collimator lens 23 of the first light source unit 14 and a collimator lens 29 of a second light source unit 15 of Embodiment 1 are abbreviated.

In addition, the first light beam group BL1 of the first light source unit 14 is folded back for 90 degrees by the ring shaped mirror 37. The ring shaped mirror 37 is hereby a light combining member (light combining unit). The second light beam group BL2 of the second light source unit 15 is folded back for 90 degrees in the same direction as the first light beam group BL1 by a folded back mirror 40. Thereby the ring shaped mirror 37 as the light combining member (light combining unit) combines the second light beam group BL2 to the first light beam group BL1. Then these first and second light beam groups BL1 and BL2 are condensed to the collecting part 31 by the condenser lenses 24 and 30.

In the first and second light beam groups BL1, BL2, the angle A2 has a relationship smaller than the angle A1. The second light beam group BL2 projected from the second light source unit 15 is arranged to pass an internal side of the first light beam group BL1 projected from the first light source unit 14. Since the first light source unit 14 and the second light source unit 15 are disposed in parallel, they can be installed on a single consecutive heat sink 39. In addition, heat release from the heat sink 39 is from one spot. Therefore, it is advantageous that air flow path releasing the heat generated from the heat sink 39 can be focused to a single direction. In contrast, if the first light source unit 14 and the second light source unit 15 adopt a constitution disposed at 90 degrees, flow of air for heat releasing also needs to have a shape corresponding to the 90 degree arrangement. But the present constitution disposes a fan on one side. Thus it is possible to simplify the cooling structure.

The illumination light beam forming device 5 of this FIG. 13 can be constituted as a projector (image forming device) by switch over to the illumination light beam forming device 5 of FIG. 4 and FIG. 6.

Figure 14:
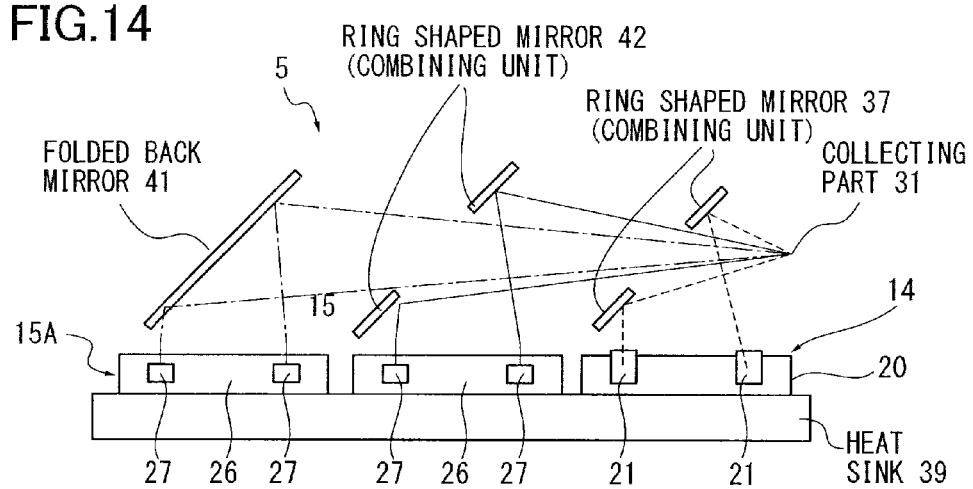
FIG. 14 is an explanatory view that illustrates another example of the illumination light beam forming device.

(Embodiment 7) FIG. 14

In the Embodiment 6 of FIG. 13, the two first and second light source units 14, 15 are arranged concurrently. The first and second light beam group BL1 and BL2 from the two first and second light source units 14, 15 are combined. But it is not necessarily limited to such.

For example, as illustrated in FIG. 14, a third light source unit 15A is disposed in addition to the first and second light source units 14, 15 of Embodiment 6. The three light source units can be concurrent by such a constitution. This third light source unit 15A has a same constitution with the second light source unit 15. The same numeral given to the second light source unit 15 is provided to the third light source unit 15A and explanations are hereby abbreviated.

In this Embodiment 7, the third light beam group BL3 projected from the third light source unit 15A is folded back 90 degrees by a folding back mirror 41. The light beams then pass within a ring shaped mirror (light combining device) 42 which is the second combining member (light combining unit), also pass within a ring shaped mirror (light combining device) 37 which is the first combining member (light combining unit). In addition, the second light beam group BL2 projected from the second light beam unit 15 is folded back by the ring shaped mirror 42 which is the second combining member (light combing unit), and passes within the ring shaped mirror 37 which is the first combining member (light combining unit). Furthermore, the first light beam group BL1 projected from the first light beam unit 14 is folded back by the ring shaped mirror 37 which is the first combining member (light combining unit).

In addition, in the present Embodiment 7, the first light beam group BL1 projected from the first light source unit 14 is condensed to the collecting part 31 at an angle A1 like the light beams illustrated by broken lines. In addition, the second light beam group BL2 projected from the second light source unit 15 is condensed to the collecting part 31 at an angle A2 like the light beams illustrated by solid lines. Furthermore, the third light beam group BL3 projected from the third light source unit 15A is condensed to the collecting part 31 at an angle A3 like the light beams illustrated by dotted chain lines.

In addition, angles A1 through A3 has a relationship of A3<A2<A1. The ring shaped mirror 42 as the second combining unit is disposed in such a way that the second light beam group BL2 projected from the second light source unit 15 passes through an internal side of the first light beam group BL1 projected from the first light source unit 14. The ring shaped mirror 37 as the first combining unit is disposed in such a way that the third light beam group BL3 projected from the third light source unit 15 passes through an internal side of the second light beam group BL2 projected from the second light source unit 15.

These first, second and third light source unit 14, 15 and 15A are disposed in parallel. Therefore, they can be arranged on a continuous heat sink 39.

The illumination light beam forming device 5 as illustrated in this FIG. 14 can also constitute a projector (image forming device) by switch over to the illumination light beam forming device 5 of FIG. 4 and FIG. 6.

Figure 15:
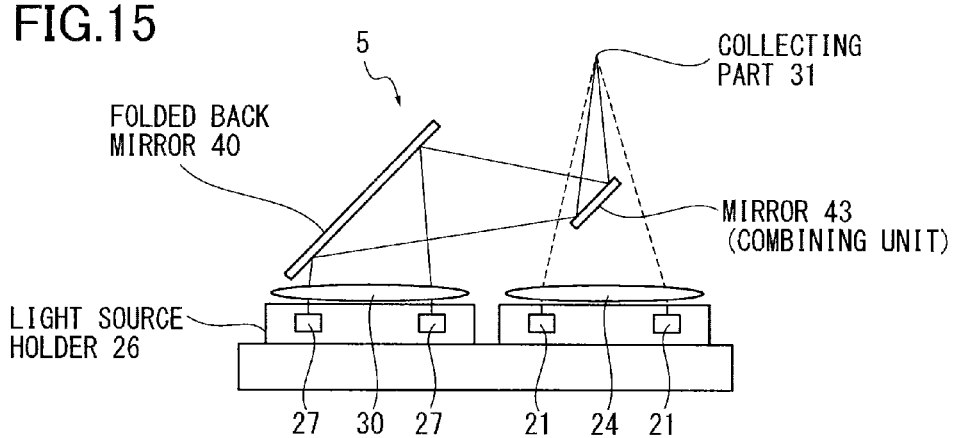
FIG. 15 is an explanatory view that illustrates another example of the illumination light beam forming device.

(Embodiment 8) FIG. 15

In the Embodiment 6 of FIG. 13, an example is illustrated in which the first light beam group BL1 is combined to a second light beam group B12 using the ring shaped mirror 37. But it is not limited to such. For example, as illustrated in FIG. 15, a circular shaped mirror (light combining device) 43 can be disposed as the combining member (light combing unit) within the first light beam group BL1. A constitution can be adopted in which this mirror 43 is made to have a gradient of 45 degrees against the light axis O1 of the first light beam group BL1. While the second light beam group BL2 can be reflected by this mirror 43 in a condensing direction of the first light beam group BL1.

In this case, the mirror 43 is small and can be obtained at a low cost. In addition, a width of an incident angle projecting into the reflecting surface is narrow. Therefore, a reflecting film of high light use efficiency can be obtained such that an illumination light source of high light use efficiency can be obtained.

The illumination light beam forming device 5 as illustrated in this FIG. 15 can also constitute a projector (image forming device) by switch over to the illumination light beam forming device 5 of FIG. 4 and FIG. 6.

Figure 16:
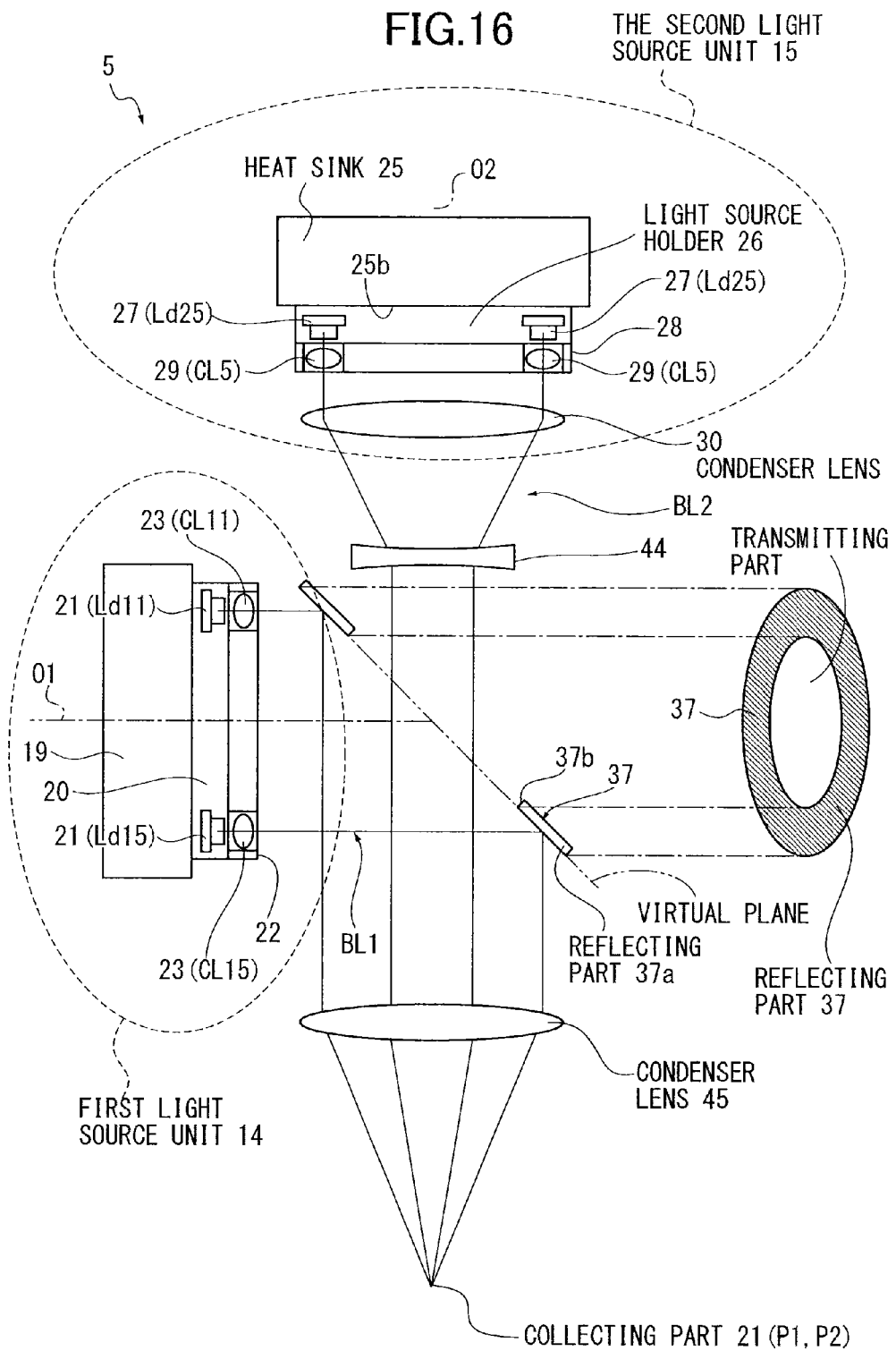
FIG. 16 is an explanatory view that illustrates another example of the illumination light beam forming device.

(Embodiment 9) FIG. 16

The first and second light beam groups BL1 and BL2 projected from the first and second light source unit 14, 15 of Embodiment 3 illustrated in FIG. 9 are collected at angles A1 and A2. In such a way, the first and second light beam group BL1 and BL2 are condensed to the collecting part 31. But it is not necessarily limited to such.

For example, as illustrated in FIG. 16, the condenser lens 24 of the first light source unit 14 of the Embodiment 3 illustrated in FIG. 9 is abbreviated hereby. As illustrated in FIG. 16, a constitution can be adopted in which a minus condenser lens 44 to make the second light beam group BL2 to be parallel beams is disposed between the condenser lens 30 of the second light source unit 15 and ring shaped mirror 37. Whereas the parallel first light beam group BL1 reflected by this second light beam group B12 and the ring shaped mirror 37 can be condensed to the collecting part 31 by the condenser lens 45.

In this Embodiment 9, the mirror 37 is hereby a combining unit. On a plane (virtual plane) including the reflecting surface of the ring shaped mirror 37, the second light beam group BL2 projected from the second light beam unit 15 is disposed in an internal side to the first light beam group BL1 projected from the first light source unit 14.

The illumination light beam forming device 5 as illustrated in this FIG. 16 can be constituted as a projector (image forming device) if switched over to the illumination light beam forming device 5 of FIG. 4 and FIG. 6.

Figure 17:
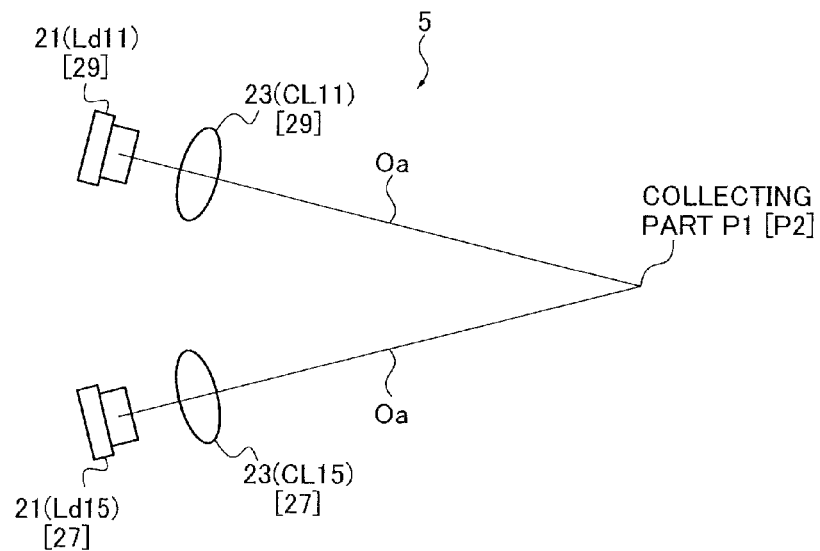
FIG. 17 is an explanatory view that illustrates another example of the light source unit.
Figure 18:
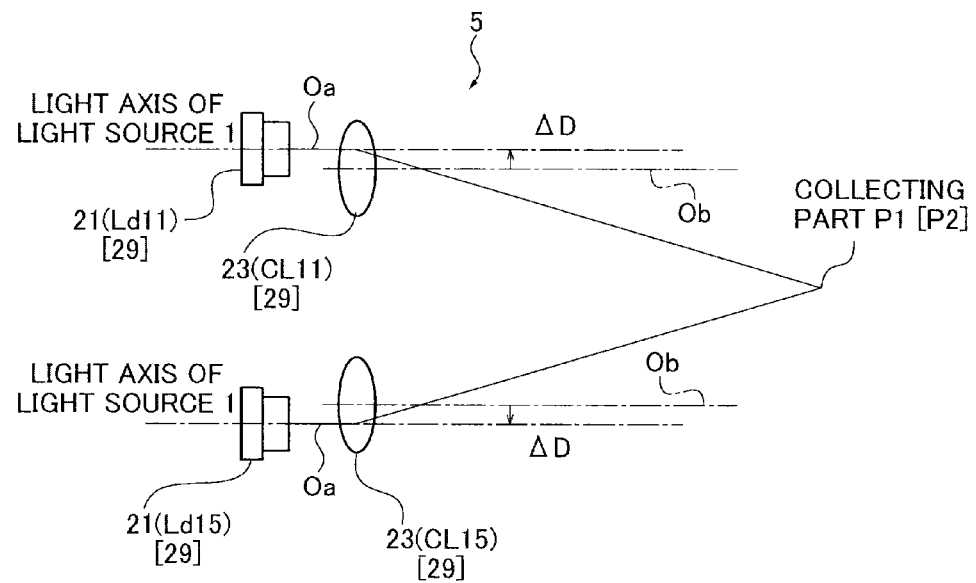
FIG. 18 is an explanatory view that illustrates another example of the light source unit.

(Embodiment 10) FIG. 17, FIG. 18

In any of the above Embodiments 1 through 9, condenser lenses 24, 30 as the condensing elements are used to condense the first and second light beam groups BL1 and BL2 to a single collecting part 31. But condensing elements can be not necessarily used. For example, as illustrated in FIG. 17, light axis Oa of solid light sources 21 of the first light source unit 14 can be made to coincide with the light axis of the collimator lens 23. This light axis Oa of the light sources can be constituted to coincide with the collecting part 31.

In addition, as illustrated in FIG. 18, light axis Oa of solid light sources 21 of the first light source unit 15 can be slide to not coincide with a lens light axis Ob of the collimator lens 23. Hereby light beams can possibly be bent. That is, the collimator lens 23 is properly shifted to deviate from its core but towards the light axis O1 side. The collimator lens 23 is constituted as such against the solid light sources 21. Thereby light beams of each solid light source 21 can be concentrated to a single point. For example, if the solid light sources 21 are disposed in a circular ring shape at diameter D, the collimator lens 23 can be disposed at a diameter smaller than the diameter D. Thereby light beams of light sources are directed inwards. However, because of the properties of the collimator lens 23, if quantity deviating from its core becomes more, it can deviate from the parallel light. Therefore, setting can be performed within an allowance range for spreading the light beams. In addition, the second light source unit 15 can be constituted to be the same with that illustrated in FIG. 17 and FIG. 18.

As a feature of the present invention, the second light beam group BL2 projected from the second light source unit 15 of one side is disposed more internal than the first light beam group BL1 projected from the first light source unit 14 of the other side. If constituted as such, various units can be employed. In other words, as illustrated in FIG. 1, the degree of condensing can be changed using condenser lenses 24 and 30. As the Embodiment 10 illustrated in FIG. 17, the solid light source 21 itself and the collimator lens 23 itself can be tilted to change the degree of condensing. In addition, as illustrated in the Embodiment 10 of FIG. 18, the light source and the collimator lens can be made to deviate from their cores. Changes in the degree of condensing can be made by such combinations. This is also true with regard to the second light source unit 15.

The illumination light beam forming device 5 as illustrated in this FIG. 17 and FIG. 18 can be constituted as a projector (image forming device) if switched over to the illumination light beam forming device 5 of FIG. 4 and FIG. 6.

Figure 19:
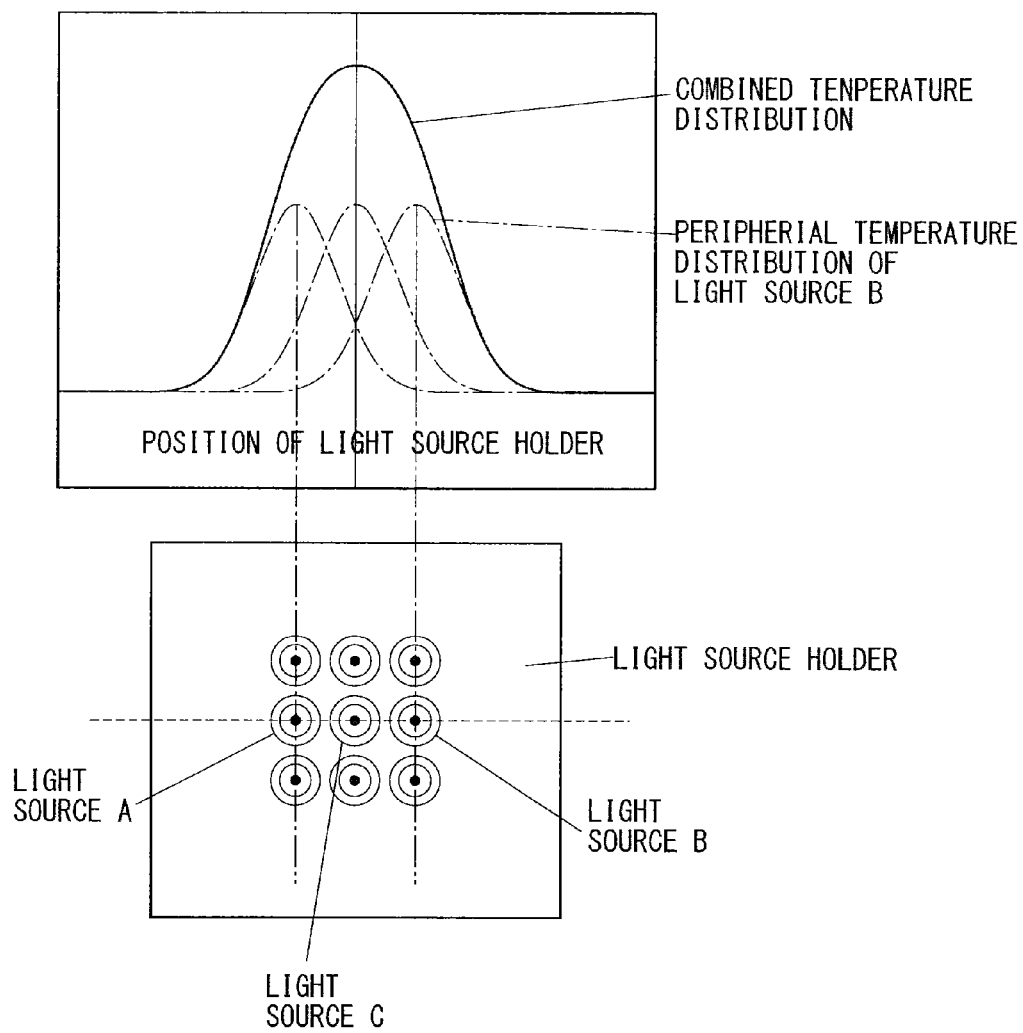
FIG. 19 is an explanatory view that illustrates in pattern diagram heat distributions generated from a plurality of solid light sources arrayed in matrix shape
Figure 20:
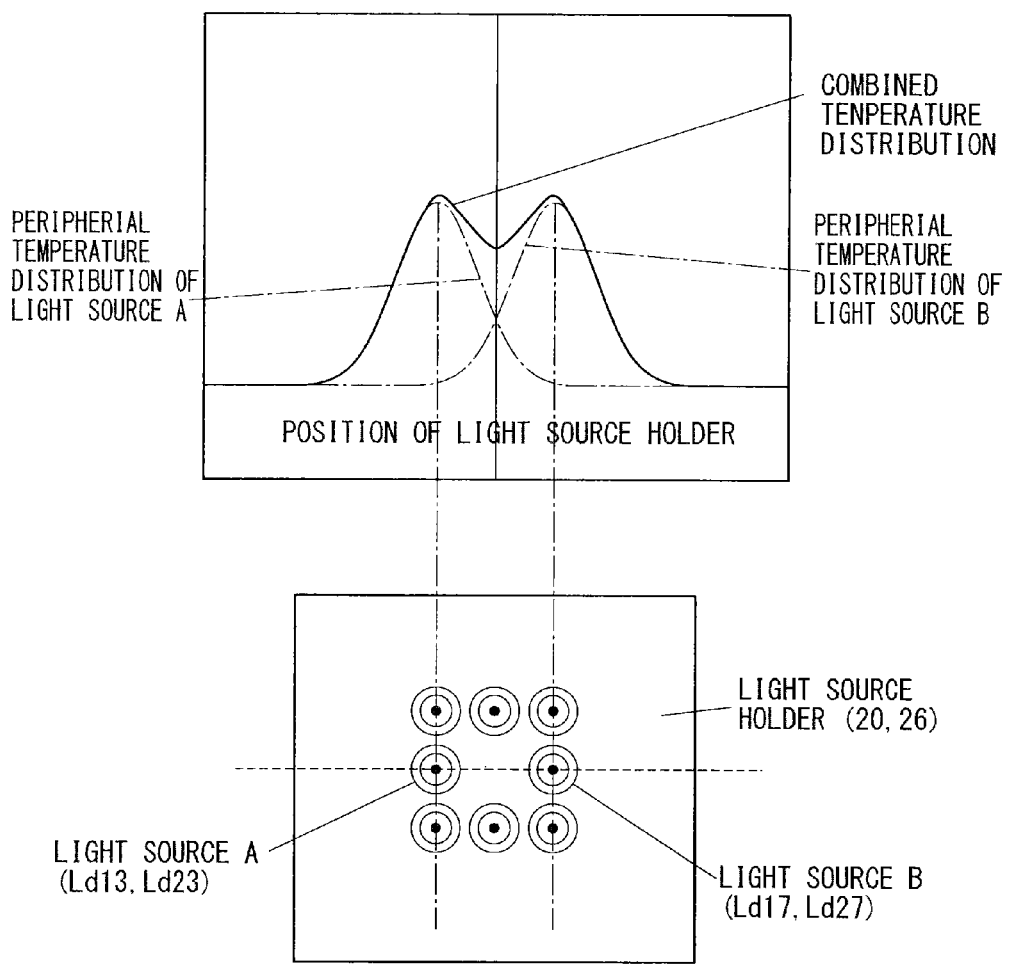
FIG. 20 is an explanatory view that illustrates in pattern diagram heat distributions generated from a plurality of solid light sources arrayed in ring shape.

(Explanations of Heat Distributions) FIG. 19, FIG. 20

By the way, by explanations of the above Embodiments 1 through 10, with regard to cooling, there is the constitution in which a plurality of solid light sources is arrayed in a matrix shape. There is also the constitution in which solid light sources are not disposed in the central part. It is explained that in the case of a rectangular array for example, an internal part and an external part have differences in cooling effects. With regard to this point, temperature gradient is illustrated in patterns. Effects in such a case with no light sources at the central part are explained. FIG. 19 and FIG. 20 illustrate heat distribution generated from the plurality of solid light sources in patterns.

In FIG. 19, LD light sources as the plurality of solid light sources are set to a 3 by 3 matrix. When attention is paid to the three light sources at the central line, if supposed only these three light sources are driven, heat distribution transmitting to the light source holder along the broken line is illustrated hereby. When the solid light sources of light source A, light source B, and light source C are independently driven, heat distribution are respectively like the broken line, the one dotted chain line and the two dotted chain line. If these solid light sources emit light simultaneously, it is clear that temperature gradient is like an actual line concentrating to the center. The actual line is formed by combining these solid light sources.

However, as illustrated in FIG. 20, when the solid light source (light source C) at the center is removed, it is understandable that temperature gradient does not rise extremely. In actual case, the conditions of temperature gradient differ according to each solid light source and heat resistance of that light source holder, thermal capacity influencing the size of light sources holders as well as shape of heat sink. In addition, influences by the three solid light sources situated above and below are also present. Therefore, temperature gradient is furthermore complex. By adopting a rectangular shaped array with no disposition at the center, or a circular ring shaped array, a design not concentrating heat at the center than the matrix array is clearly advantageous.

Figure 21:
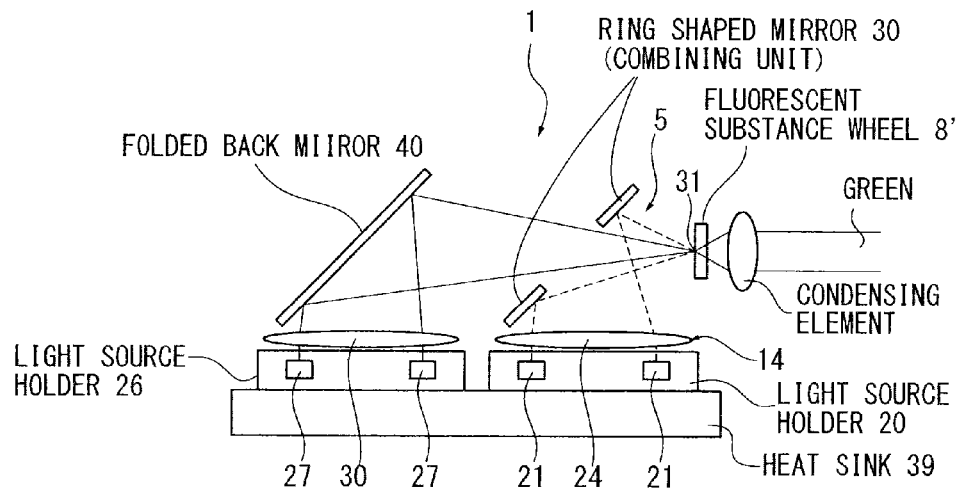
FIG. 21 is an explanatory view that illustrates another example of the illumination light source device.
Figure 22:
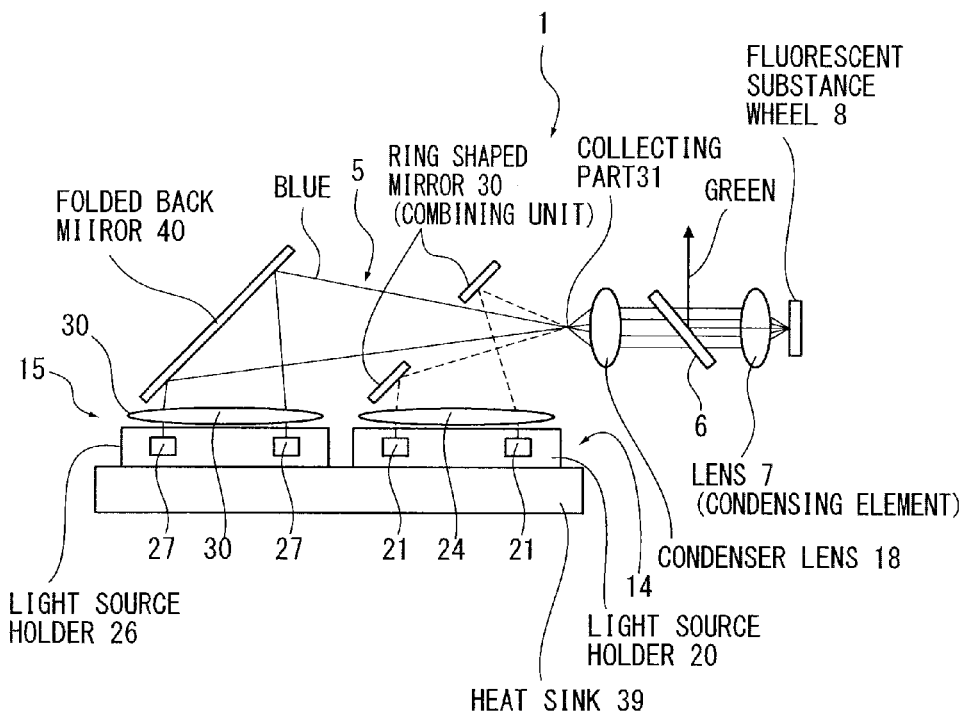
FIG. 22 is an explanatory view that illustrates another example of the illumination light source device.

(Embodiment 11) FIG. 21, FIG. 22

FIG. 21 and FIG. 22 illustrate an illumination light source device 1 constituting the illumination light beam forming device 5 of Embodiment 6 as illustrated in FIG. 13.

The illumination light source device 1 of FIG. 19 irradiates to a fluorescent substance wheel 8' the illumination light beams of the illumination light beam forming device 5 in Embodiment 6. The fluorescent substance wheel 8' is a wavelength converting member. Therefore, Embodiment 11 generating differing colors is hereby illustrated.

In addition, the illumination light source device 1 of FIG. 20 irradiates to a fluorescent substance wheel 8 the illumination light beams of the illumination light beam forming device 5 in Embodiment 6. The fluorescent substance wheel 8 is a wavelength converting member. Therefore, Embodiment 11 generating differing colors is hereby illustrated.

In the illumination light source device 1 of FIG. 21, the first light beam group BL1 of the first light source unit 14 of the illumination light beam forming device 5 and the second light beam group BL2 of the second light source unit 15 of the illumination light beam forming device 5 condense to a point (collecting part 31). The fluorescent substance wheel 8' as the wavelength converting member is disposed at this point.

In the illumination light source device 1 of FIG. 22, the first light beam group BL1 of the first light source unit 14 of the illumination light beam forming device 5 and the second light beam group BL2 of the second light source unit 15 of the illumination light beam forming device 5 are condensed to the collecting part 31 to be emanated thereafter. Then the lens 18 of the illumination light beam forming device 5 makes them parallel light beams. Then the illumination light beam Lb as this parallel light beam is transmitted through a dichroic mirror 6 and then incident into the fluorescent substance wheel 8 by the lens 7.

For example, a blue semiconductor laser close to 440 nm can be proper for the solid light sources 21, 27 of the first and second light source units 14, 15. In the present Embodiment 11, blue semiconductor lasers are used for the solid light sources 21, 27. Therefore, the first and second light beam group BL1 and BL2 from the plurality of solid light sources 21, 27 are light beam groups of blue laser light.

In addition, light sources projecting ultraviolet light of a shorter wavelength can be adopted for the solid light sources 21, 27. In this case, a fluorescent light part excited by ultraviolet light to generate G (green) fluorescent light, a fluorescent light part excited by ultraviolet light to generate R (red) fluorescent light, a fluorescent light part excited by ultraviolet light to generate B (blue) fluorescent light are disposed in the fluorescent substance wheel 8. In addition, solid light sources 21, 27 can be LED light sources. Green of YAG series, fluorescent substance having yellow green emitting colors, green of sialon series and red fluorescent substance or the like are proper as wavelength converting materials of the wavelength converting member.

In the illumination light source device 1 of FIG. 21, light emitted from the fluorescent substance wheel 8' emits light at a certain divergence angle. Therefore, it is condensed by the lens 9. By such an illumination light source, light sources of a desired color can be obtained. In addition, the fluorescent substance wheel 8' illustrated in FIG. 21, as illustrated hereby in FIG. 7, includes a circular disc shaped translucent substrate 8a', a wavelength converting member 8b' disposed on this substrate 8a, a light transmitting part 8c' disposed to not have fluorescent substance. Wavelength converting material of one kind or more is used as the wavelength converting member in this wavelength converting part 8b'. A fluorescent substance explained using FIG. 7 is used for this wavelength converting material.

In FIG. 22, another Embodiment 11 is illustrated. In this Embodiment 11, on a substrate constituted by a reflecting member of a reflecting mirror or the like, illumination light beams are excited and reflected by a fluorescent substance wheel 8 applied with fluorescence. The reflected fluorescent light is separated from the excited light by the dichroic mirror 6. The wavelength of the fluorescent light is thereby taken out. This fluorescent substance wheel 8 includes a circular disc shaped substrate 8a as illustrated in FIG. 5, a wavelength converting member 8b disposed on this substrate 8a and a light reflecting part 8c not disposed with the fluorescent substance. Wavelength converting material of one kind or more is used as the wavelength converting member in this wavelength converting part 8b. A fluorescent substance is used for this wavelength converting material.

In the illumination light beam forming device 5 of FIG. 22, blue colored first and second light beam groups BL1 and BL2 due to blue laser beams from the first and second light source units 14, 15 are focused to a focusing part 31 by condenser lenses 24, 30. Thereafter, the light beams are emanated. Then a condenser lens (condensing element) 18 is disposed midway of a light path of the emanated illumination light beams. By this lens 18, illumination light beams become comparatively parallel.

Light passed through the lens 18, that is, excited light is irradiated to the fluorescent substance wheel 8 via the dichroic mirror 6. The dichroic mirror 6 has a property that transmits excited light and reflects fluorescent light. The excited light transmitted through the dichroic mirror 6 is condensed to the fluorescent substance wheel 8 by the lens 18. Illumination light beams are condensed on the fluorescent substance wheel 8. A condensing spot of such illumination light beams emits fluorescent light. The fluorescent light emitted from this spot is again condensed by a condensing element 7 to direct towards the dichroic mirror 6. Then fluorescent light is reflected by the dichroic mirror 6. The fluorescent light can be taken out thereby.

In this Embodiment 11, as the same with the Embodiment 11 of FIG. 21, a blue semiconductor laser close to 440 nm can be proper for the solid light sources 21, 27. In addition, ultraviolet light of a shorter wavelength can be adopted. Green of YAG series, fluorescent substance having yellow green emitting colors, green of sialon series and red fluorescent substance or the like are proper as wavelength converting materials of the wavelength converting member.

In addition, because a plurality of light source units using solid light sources are combined with the wavelength converting member, a light source device of differing colors can be obtained.

(Others)

In FIG. 9, a ring shaped mirror 37 is disposed. Light from the first light source unit 14 is reflected by the ring shaped mirror 37. Light from the second light source unit 15 transmits through an internal side of the ring shaped mirror 37. But it is not necessarily limited to such.

Figure 23:
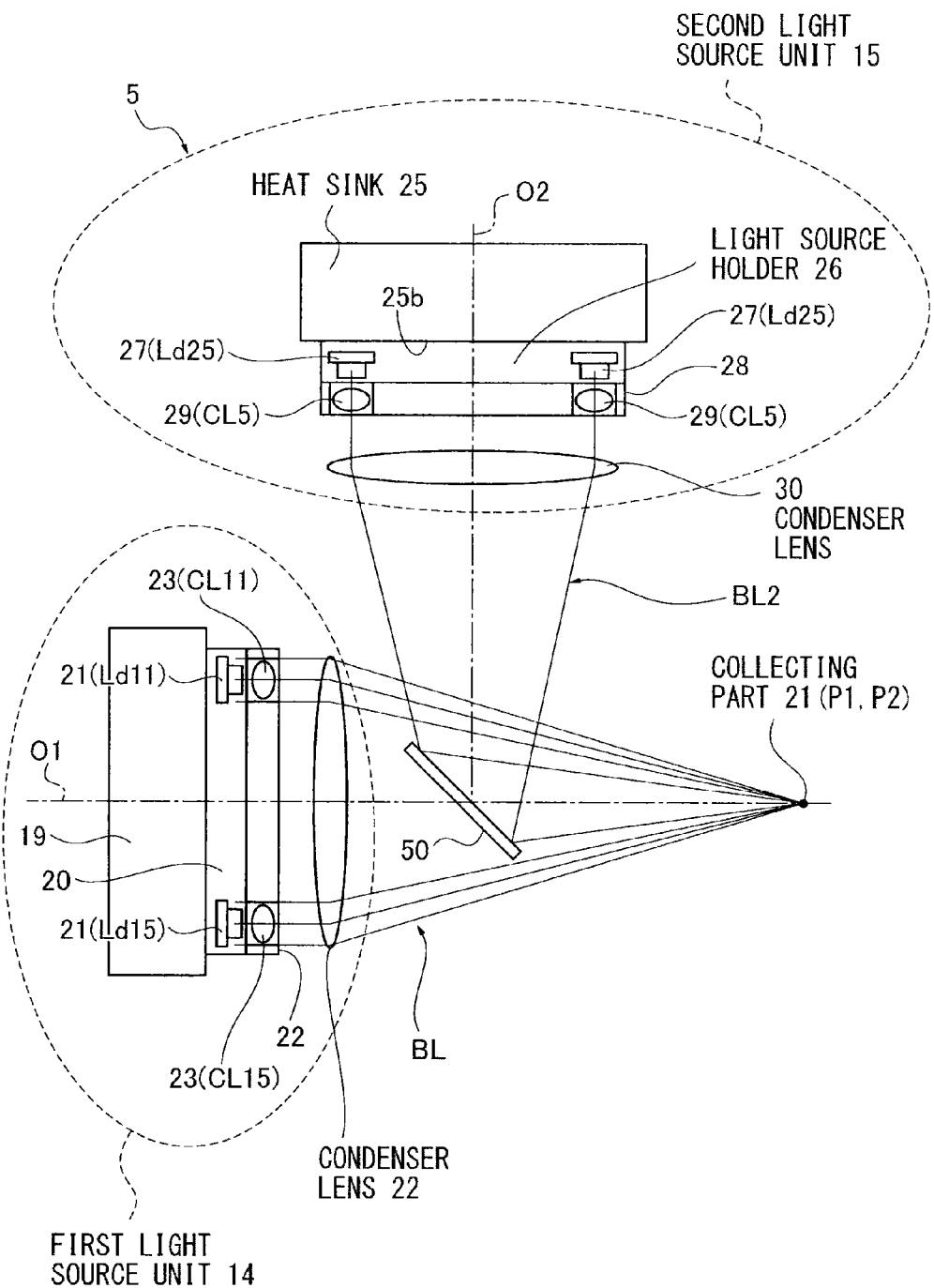
FIG. 23 is an explanatory view that illustrates a modified example of the illumination light source device as illustrated in FIG. 9.

For example, as illustrated in FIG. 23, a ring shaped mirror 50 is disposed at a position of the ring shaped mirror 37 of FIG. 9. In such a way, light from the second light source unit 15 is reflected by the ring shaped mirror 50. Light from the first light source unit 14 can be made to not reflected by the ring shaped mirror 50 but passes through an external circumference of the ring shaped mirror 50. In addition, solid light sources 27 disposed on the second light source unit 15 can adopt a singular or plural, ring shaped or other shaped disposition. For example, grid shape can also be adopted.

(Complementary Description 1)

As described above, the illumination light beam forming device 5 of these Embodiments 1 through 11 of the present invention disposes a first light source unit 14 projecting a ring shaped light beam group, a second light source unit 15 projecting light beams possibly being light beam group, a combining unit (light combining plate 16, a ring shaped mirror 37, 42, a folded back mirror 43, a ring shaped mirror 50) combining the light beam group projected from the first light source unit 14 and light beams projected from the second light source unit 15. In addition, the above combining unit includes a reflecting part formed to possibly reflect one of the light beam group (a reflecting part 16b, 37a, reflecting surfaces of the ring shaped mirror 37, 42, reflecting surface of the folded back mirror 43, reflecting surface of the ring shaped mirror 50), a pass through part disposed to possibly pass through the other one of the light beam group (light transmitting part 16a at an external side of the reflecting part 16b of the light combining plate 16, the pass through part at an internal side of the ring shaped mirror 37, 42, 43 or an external side of the ring shaped mirror 50). In addition, when viewing the two light beam groups on a plane including the reflecting part, the light beams projected from the second light source unit 15 are disposed at an internal side to the light beams projected from the first light source unit 14.

As described above, hereby the light combining plate 16, the ring shaped mirror 37, 42, the folded back mirror 43, the circular mirror 50 or the like are a light combining device serving as the light combining unit, that is, the light combining member.

By such a constitution, the light source unit 14, 15 disposed with the plurality of light sources can be efficiently cooled to be able to obtain a stable illumination light.

In addition, the reflecting part is consecutively formed on a same plane. Therefore, reflecting light of light beams emitted from each solid light source 21, 27 have no variations in reflecting angles. Therefore, combined beam diameter is not spread but condensed to a desired condensing position. Efficiency degradation by the optical system thereafter can be prevented.

(Complementary Description 2)

In addition, in the illumination light beam forming device 5 of these Embodiments 1 through 11 of the present invention, when viewing the two light beam groups BL1, BL2 or BL2, BL3 on a plane including the reflecting part 16b, reflecting surface of the ring shaped mirror 37, a reflecting surface of the ring shaped mirror 42, a reflecting surface of the mirror 43, a plurality of solid light sources 21 or 27 of the light source unit is arranged in ring shape. In the light source unit, one light beam group BL1 or BL2 is disposed at a periphery encircling the other central light beam group BL2 or BL3 to achieve a ring shape.

By such a constitution, the plurality of solid light sources 21 or 27 of the light source unit 14, 15 is arranged in ring shape. Therefore, heat release is performed uniformly. Light emissions of the light source are performed uniformly. Consequently, a light source of high reliability can be obtained.

(Complementary Description 3)

In addition, in the illumination light beam forming device 5 of these Embodiment 1 through 11, light beam groups projected from a plurality of solid light sources 21, 27, 27 of each light source unit 14, 15, 15A are condensed by condensing elements to a collecting part 31 of a single point. Such condensing elements 24, 30, 30 are respectively disposed herein. Each condensing element (condensing element 24, 30, 30) and the combining unit (light combining plate 16, ring shaped mirror 37, 42, mirror 43) are disposed in a way that a collecting part 31 of each condensing element (condenser lens 24, 30, 30) can mutually coincide.

By such a constitution, illumination light is combined to a desired condensing position (collecting part 31). Therefore, efficiency degradation by the optical system thereafter can be prevented.

(Complementary Description 4)

In addition, in the illumination light beam forming device 5 of these Embodiments 1 through 11 of the present invention, light beam groups BL1, BL2 projected from the plurality of solid light sources 21, 27 of each light source unit are made into parallel light beams by optical elements (condenser lens 44 and collimator lens 23) respectively disposed. The optical elements are used to make for parallel light beams. The parallel light beams are then made to incident into the combining unit (ring shaped mirror 37). In addition, the light beam group BL2 transmitted through the transmitting part (an internal side of the ring shaped mirror 37) of the combining unit (ring shaped mirror 37) and the light beam group BL1 reflected by the reflecting part of the combining unit (ring shaped mirror 37) are condensed by a condensing element (condenser lens 45) to a single point. The condensing element is disposed hereby.

By such constitution, light beam group BL1, BL2 projected from the light source unit 14, 15 are made to be approximately parallel. Therefore, in the reflecting part (reflecting surface) formed on the combining unit (ring shaped mirror 37), an angular dependency due to incident angles is reduced. Thus an illumination light source with high light use efficiency of illumination light can be obtained. In addition, the condensing element (condenser lens 45) can be in shared use. Therefore, a low cost, high space efficiency light source unit can be obtained.

(Complementary Description 5)

In addition, in the illumination light beam forming device 5 of these Embodiments 1 through 11 of the present invention, the plurality of light source units stands for the two light sources units of the first and second light source units 14 and 15. The combining unit (light combining plate 16, ring shaped mirror 37) includes a reflecting part 16b, reflecting surface of the ring shaped mirror 37 formed consecutively on a same plane. The reflecting part can reflect the other one of the two light beam groups. The combining unit also includes a transmitting part disposed more external than the reflecting part 16b and more internal than the ring shaped mirror 37. The transmitting part is disposed to be able to transmit one of the two light beam groups.

By such a constitution, the light beam group BL2 projected from the other light source unit 15 is at an internal side of the light beam group BL1 projected from the one light source unit 14. Therefore, a width of the light beam group is small. In addition, an angle thereof is also small. Thus the size of a reflecting surface can be made small. Ranges of incident angle are also narrow. Thus an illumination light source with high light use efficiency can be obtained.

(Complementary Description 6)

In addition, the plurality of light source unit 14, 15, 15A of the illumination light beam forming device 5 of this these Embodiment 1 through 11 of the present invention is disposed to have projecting light beams project towards a same direction. Hereby a common heat sink 39 is also included.

By such a constitution, the heat sink 39 can be made of a single part. Therefore, lower cost is realized. In addition, cooling direction can be made to a single direction. Therefore, degree of freedom of cooling airflow design is improved when incorporated into as a set.

(Complementary Description 7)

In addition, in the illumination light beam forming device 5 of these Embodiments 1 through 11 of the present invention, the light source unit 14, 15 includes a plurality of collimator lenses 23, 29 that respectively collect the light beams projected from the plurality of solid light sources 21, 27. The plurality of solid light sources 21, 27 and the plurality of collimator lenses 23, 29 are both disposed in discrete state. In addition, centers of each of the plurality of solid light sources 21, 27 and centers of each collimator lenses 23, 29 respectively corresponding to the each of the plurality of solid light sources 21, 27 are connected by lines. These lines are respectively set to be light axes (light axis Oa of light source). When in such a state, the plurality of solid light sources 21, 27 and collimator lenses 23, 39 are disposed such that each light axis (light axis Oa of light source) can be focused to a single point.

By such a constitution, a plurality of light source light can be condensed to a single point with no condenser lens. Therefore, decreases in parts number can be realized.

(Complementary Description 8)

In addition, in the illumination light beam forming device 5 of these Embodiments 1 through 11 of the present invention, the light source unit includes a plurality of collimator lenses 23, 29 that respectively focus light beams projected from the plurality of solid light sources 21, 27. The plurality of solid light sources 21, 27 and the plurality of collimator lenses 23, 29 are both disposed in discrete state. In addition, lens light axis Ob of the plurality of collimator lenses 23, 29 is disposed to respectively deviate from their cores against the light source light axis Oa of each of the plurality of solid light sources 21, 27. Thereby light beams projected from each of the plurality of solid light sources 21, 27 can possibly focus to a single point.

By such a constitution, there is no need for the condenser lens. But the plurality of light source light can be collected to a single point. Thereby decrease in the number of parts can be realized.

(Complementary Description 9)

In addition, the illumination light beam forming device 1 of these Embodiments 1 through 11 of the present invention includes a wavelength converting member (fluorescent substance wheel 8, 8'). The wavelength converting member is made to perceive light source light projected from the illumination light beam forming device 5. The light source light is hereby incident into the wavelength converting member as excited light. This wavelength converting member (fluorescent substance wheel 8, 8') generates an illumination light having a differing wavelength than the incident light source light.

By such a constitution, because the wavelength converting member (fluorescent substance wheel 8, 8') is combined, a light source device of differing colors can be obtained.

(Complementary Description 10)

In addition, image forming device in these Embodiments 1 through 11 of the present invention includes a hereby described illumination light source device 1, an image generating part (image forming element 3) and an enlarged projection device (projecting lens 4).

By such a constitution, number of kinds of light source is not increased. But a display device able to obtain color images can be realized.

By such a constitution of the present invention, the light source unit disposed with the plurality of solid light sources can be cooled efficiently. Thus a stable illumination light can be obtained.

Although the preferred embodiments of the present invention have been described, it should be understood that the present invention is not limited to these embodiments, various modifications and changes can be made to the embodiments by those skilled in the art.

What is claimed is:

1. An illumination light beam forming device, comprising:
   a first light source unit including corresponding light sources, the first light source unit projecting a ring shaped light beam group,
   a second light source unit including corresponding light sources, the second light source unit projecting light beams, the light beams from the second light source unit being a light beam group,
   a combining unit for combining the light beam group projected from the first light source unit and light beams projected from the second light source unit, wherein
   the combing unit includes a reflecting part formed to reflect one of the light beam groups, a transmitting part disposed able to transmit the other one of the light beam groups, and
   light beams projected from the second light source unit are disposed at an internal side of the light beam groups projected from the first light source unit when the two light beam groups are viewed from a plane including the reflecting part,
   wherein when the two light beam groups are viewed from a plane including the reflecting part, the ring shaped light beam group is disposed at a periphery encircling the light beam group of the second light source.

2. An illumination light beam forming device according to claim 1, further comprising:
   condensing elements respectively disposed to collect light beam groups to a collecting part of a single point, the light beam groups projected from the plurality of light sources of each light source unit,
   wherein each of the condensing elements and the combining unit are disposed such that the collecting part of each condensing element can coincide.

3. An illumination light source device, comprising:
   a wavelength converting member towards which light source light projects into as excited light, the light source light projected out from the illumination light beam forming device according to claim 2,
   wherein the light source light incident into the wavelength converting member generates an illumination light of differing wavelength.

4. An image display device, comprising:
   the illumination light source device according to claim 3,
   an image generating part and
   an enlarged projection unit.

5. An illumination light beam forming device according to claim 1, further comprising:
   optical elements to make parallel beams respectively disposed such that light beam groups projected from the plurality of solid light sources of each light source unit are projecting into the combining unit as parallel light beams,
   wherein condensing elements are disposed for collecting to a single point light beams reflected by the reflecting part of the combining unit and transmitted through the transmitting part of the combining unit.

6. An illumination light source device, comprising:
   a wavelength converting member towards which light source light projects into as excited light, the light source light projected out from the illumination light beam forming device according to claim 5, wherein
   the light source light incident into the wavelength converting member generates an illumination light of differing wavelength.

7. An illumination light beam forming device according to claim 1, wherein
   the plurality of light source units are the two units of the first and second light source units,
   the combining unit includes a reflecting part formed consecutively on a same plane to reflect the other of two light beam groups, a transmitting part disposed to transmit the one of the two light beam groups.

8. An illumination light source device, comprising:
   a wavelength converting member towards which light source light projects into as excited light, the light source light projected out from the illumination light beam forming device according to claim 7, wherein the light source light incident into the wavelength converting member generates an illumination light of differing wavelength.

9. An illumination light beam forming device according to claim 1, further comprising:
a common heat sink,
wherein the plurality of light source units are disposed such that projecting light beams are projected out towards a same direction.

10. An illumination light source device, comprising:
a wavelength converting member towards which light source light projects into as excited light, the light source light projected out from the illumination light beam forming device according to claim 9,
wherein the light source light incident into the wavelength converting member generates an illumination light of differing wavelength.

11. An illumination light beam forming device according to claim 1, wherein
the light source unit further includes a plurality of collimator lenses that respectively focus light beams projected out from the plurality of light sources, the light sources disposed discretely, and
lines connecting the center of each of the plurality of light sources and the center of each of the collimator lenses are respectively set as light axes, the collimator lenses respectively correspond to the plurality of light sources, the plurality of light sources and collimator lenses are disposed such that each of the light axes can be collected to a single point.

12. An illumination light source device, comprising:
a wavelength converting member towards which light source light projects into as excited light, the light source light projected out from the illumination light beam forming device according to claim 11,
wherein the light source light incident into the wavelength converting member generates an illumination light of differing wavelength.

13. An illumination light beam forming device according to claim 1, wherein
the light source unit further includes a plurality of collimator lenses that respectively focus light beams projected out from the plurality of solid light sources, the light sources disposed discretely,
light axes of the plurality of collimator lenses are deviated respectively from their cores against light axes of each of the plurality of light sources such that light beams projected out from each of the plurality of light sources can be collected to a single point.

14. An illumination light source device, comprising:
a wavelength converting member towards which light source light projects into as excited light, the light source light projected out from the illumination light beam forming device according to claim 13,
wherein the light source light incident into the wavelength converting member generates an illumination light of differing wavelength.

15. An illumination light source device, comprising:
a wavelength converting member towards which light source light projects into as excited light, the light source light projected out from the illumination light beam forming device according to claim 1,
wherein the light source light incident into the wavelength converting member generates an illumination light of differing wavelength.

16. An illumination light source device, comprising:
a wavelength converting member towards which light source light projects into as excited light, the light source light projected out from the illumination light beam forming device according to claim 15,
wherein the light source light incident into the wavelength converting member generates an illumination light of differing wavelength.

17. An image display device, comprising:
the illumination light source device according to claim 15,
an image generating part and
an enlarged projection unit.

* * * * *